(12) United States Patent
Singh et al.

(10) Patent No.: US 10,458,450 B2
(45) Date of Patent: Oct. 29, 2019

(54) OPTICAL PROBE WITH CRASH PROTECTION AND PROBE CLIPS

(71) Applicant: Hexagon Metrology, Inc., North Kingstown, RI (US)

(72) Inventors: Gurpreet Singh, Providence, RI (US); Paul Racine, Providence, RI (US); John Langlais, Coventry, RI (US); Jie Zheng, Mansfield, MA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 301 days.

(21) Appl. No.: 15/461,308

(22) Filed: Mar. 16, 2017

(65) Prior Publication Data

US 2017/0268867 A1     Sep. 21, 2017

Related U.S. Application Data

(60) Provisional application No. 62/309,172, filed on Mar. 16, 2016, provisional application No. 62/309,212, (Continued)

(51) Int. Cl.
*F16B 2/20* (2006.01)
*G01B 11/00* (2006.01)
*G01B 21/04* (2006.01)

(52) U.S. Cl.
CPC .............. *F16B 2/20* (2013.01); *G01B 11/005* (2013.01); *G01B 11/007* (2013.01); *G01B 21/047* (2013.01)

(58) Field of Classification Search
CPC ............ G01B 9/02023; G01B 9/02029; G01B 9/0203; G01B 9/02031; G01B 9/0205;
(Continued)

(56) References Cited

U.S. PATENT DOCUMENTS 5,083,379 A * 1/1992 Enderle .............. G05B 19/4144
33/556
5,181,774 A  1/1993 Lane
(Continued)

FOREIGN PATENT DOCUMENTS

DE     3526633     2/1987
DE     0215233     3/1987
(Continued)

OTHER PUBLICATIONS

International Searching Authority, Invitation to Pay Additional Fees and, Where Applicable, Protest Fee, PCT/US2017/022817, 13 pages, dated May 31, 2017.
(Continued)

*Primary Examiner* — Yaritza Guadalupe-McCall
(74) *Attorney, Agent, or Firm* — Nutter McClennen & Fish LLP

(57) ABSTRACT

A probe head of a coordinate measuring machine ("CMM") includes a sensor to detect impact of the probe head with a foreign object. The probe head is movably coupled to the CMM such that the sensor detects motion of the probe head relative to a portion of the CMM resulting from an impact event. Some embodiments cause the CMM to take action in response to detecting an impact. Probe clips allow adjustment of the position of a CMM probe relative to the portion of the CMM from which the probe is suspended. This allows the position and orientation of the CMM probe to be adapted to a variety of applications.

20 Claims, 18 Drawing Sheets

Related U.S. Application Data filed on Mar. 16, 2016, provisional application No. 62/309,202, filed on Mar. 16, 2016, provisional application No. 62/309,274, filed on Mar. 16, 2016.

(58) Field of Classification Search
CPC .... G01B 5/008; G01B 11/007; G01B 21/047; G01B 21/04; G01B 21/042; G01B 5/012; G01B 11/005
USPC .......................................................... 33/503
See application file for complete search history.

(56) References Cited

U.S. PATENT DOCUMENTS

| | | | | |
|---|---|---|---|---|
| 5,210,399 | A * | 5/1993 | Maag | G01B 11/007 250/202 |
| 5,327,657 | A * | 7/1994 | Hajdukiewicz | B23Q 5/58 33/503 |
| 5,404,649 | A * | 4/1995 | Hajdukiewicz | B23Q 5/58 33/503 |
| 5,782,445 | A * | 7/1998 | Cleek | B23K 7/10 248/206.5 |
| 5,822,877 | A | 10/1998 | Dai | |
| 5,867,916 | A * | 2/1999 | Matzkovits | G01B 21/047 33/503 |
| 5,909,938 | A * | 6/1999 | Brenner | G01B 5/008 33/503 |
| 6,333,696 | B1 * | 12/2001 | Matsumiya | B25J 19/063 340/679 |
| 6,519,860 | B1 * | 2/2003 | Bieg | B23H 7/26 33/1 PT |
| 6,701,633 | B2 | 3/2004 | Ohtsuka | |
| 6,852,002 | B2 * | 2/2005 | Stewart | B23Q 5/58 451/10 |
| 7,227,647 | B2 | 6/2007 | Ferger | |
| 7,520,187 | B2 * | 4/2009 | Merritt, Jr. | G01B 21/16 33/503 |
| 7,903,245 | B2 | 3/2011 | Miousset et al. | |
| 8,336,220 | B2 * | 12/2012 | Eaton | G01B 21/047 33/1 PT |
| 8,375,594 | B1 * | 2/2013 | Guenther | B25J 19/0008 33/503 |
| 8,479,403 | B2 * | 7/2013 | Jordil | G01B 5/012 33/503 |
| 2009/0025243 | A1 * | 1/2009 | Prestidge | G01B 5/012 33/559 |
| 2009/0255139 | A1 * | 10/2009 | Wallace | G01B 5/012 33/503 |
| 2011/0258868 | A1 * | 10/2011 | Jordil | G01B 5/012 33/503 |
| 2015/0101205 | A1 | 4/2015 | Jensen et al. | |
| 2015/0176958 | A1 * | 6/2015 | Rouge | G01B 5/012 33/503 |
| 2015/0285608 | A1 * | 10/2015 | Singh | G01B 5/008 33/503 |
| 2016/0025479 | A1 | 1/2016 | Vuilloud et al. | |
| 2016/0084633 | A1 * | 3/2016 | Ferrari | G01B 21/04 33/503 |
| 2016/0363431 | A1 * | 12/2016 | Tanaka | G01B 5/008 |

FOREIGN PATENT DOCUMENTS

| | | |
|---|---|---|
| DE | 10100352 | 7/2002 |
| DE | 102004044348 | 4/2006 |
| DE | 102008004037 | 7/2009 |
| DE | 102011001976 | 11/2011 |
| DE | 102013113407 | 6/2015 |
| EP | 2977715 | 1/2016 |
| WO | WO 02/27270 | 4/2002 |
| WO | WO 2004/025222 A1 | 3/2004 |

OTHER PUBLICATIONS

International Searching Authority, International Search Report and Written Opinion of International Searching Authority, PCT/US2017/022820, 17 pages, dated May 30, 2017.

International Searching Authority International Search Report—International Application No. PCT/US2017/022817, dated Aug. 4, 2017, together with the Written Opinion of the International Searching Authority, 22 pages.

* cited by examiner

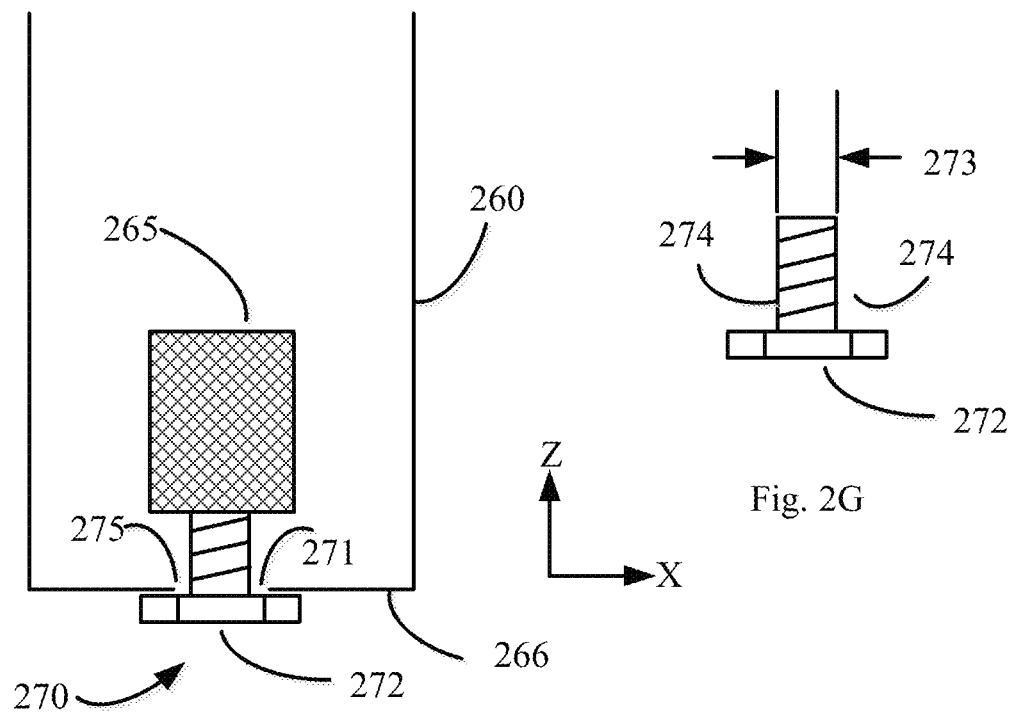
Fig. 2F
Fig. 2G
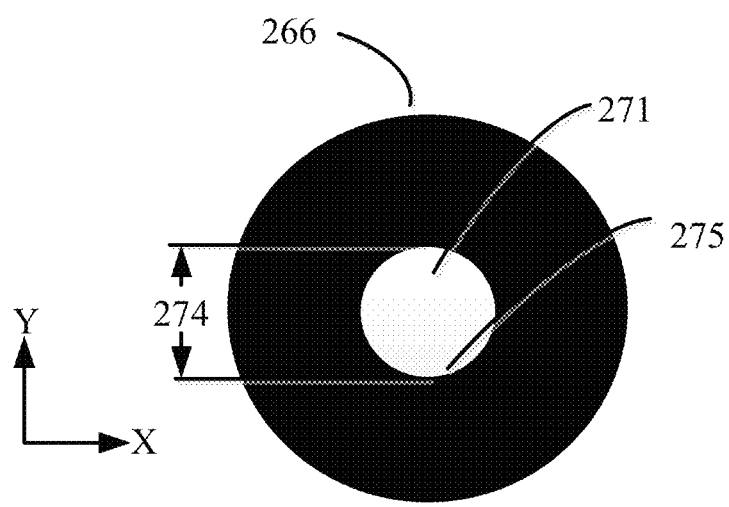
Fig. 2H

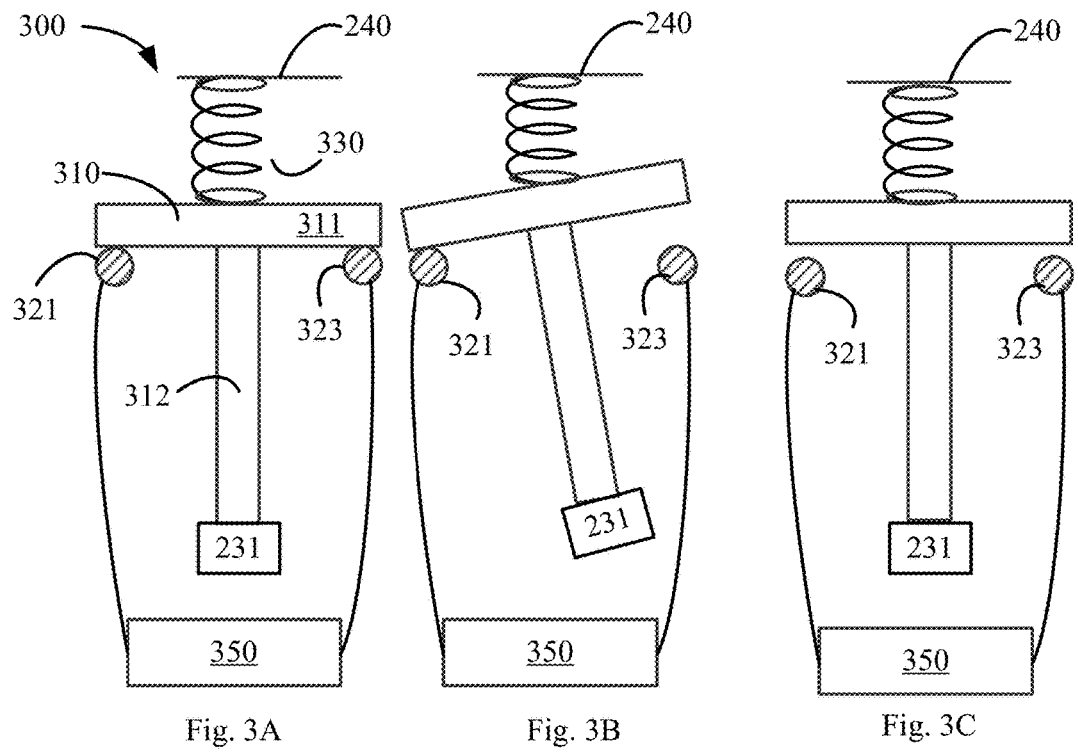
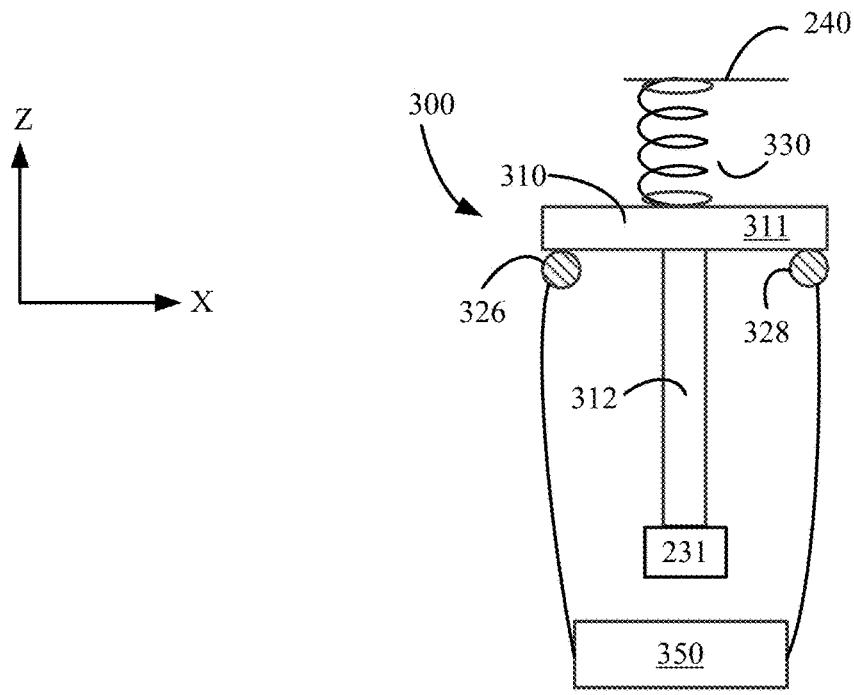

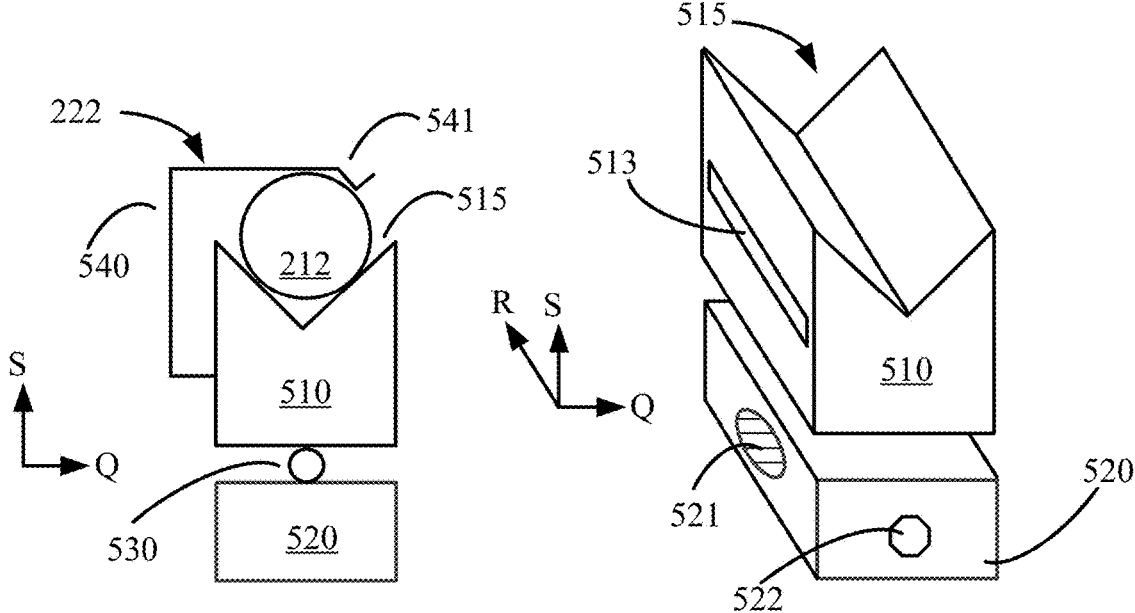
Fig. 5A
Fig. 5B
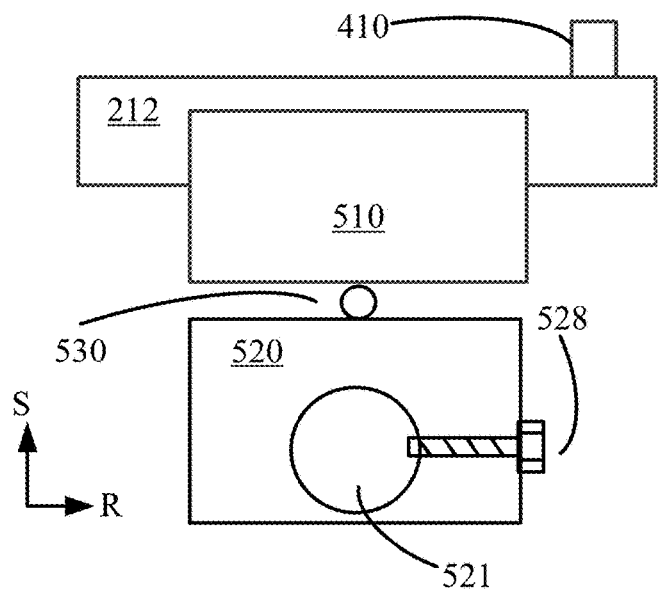
Fig. 5C

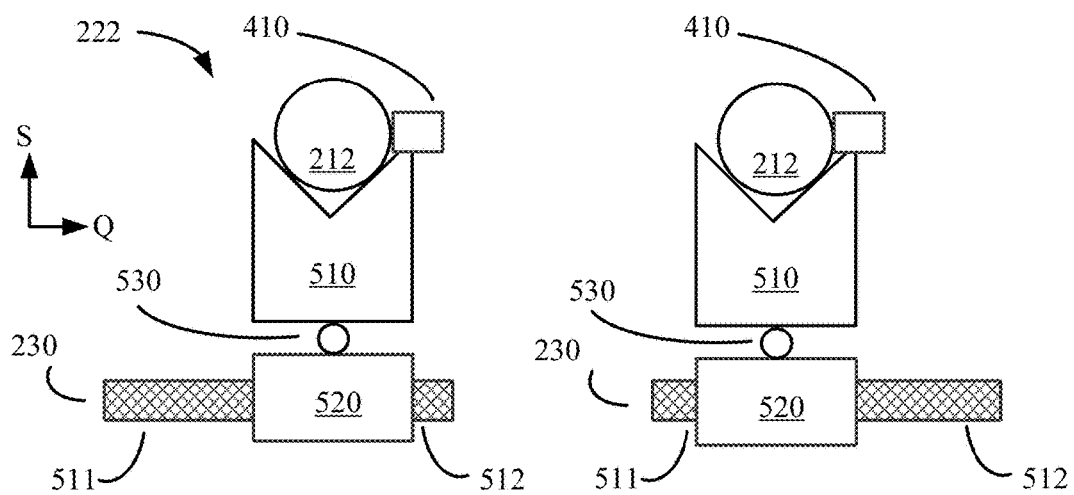
Fig. 5D – Pre-translation
Fig. 5E – Post-translation
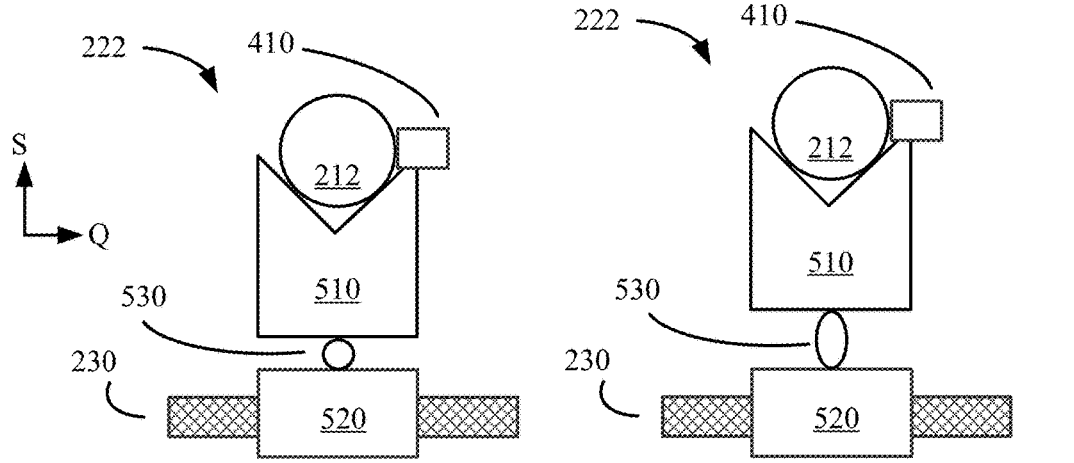
Fig. 5F – Pre-extension
Fig. 5G – Post-extension

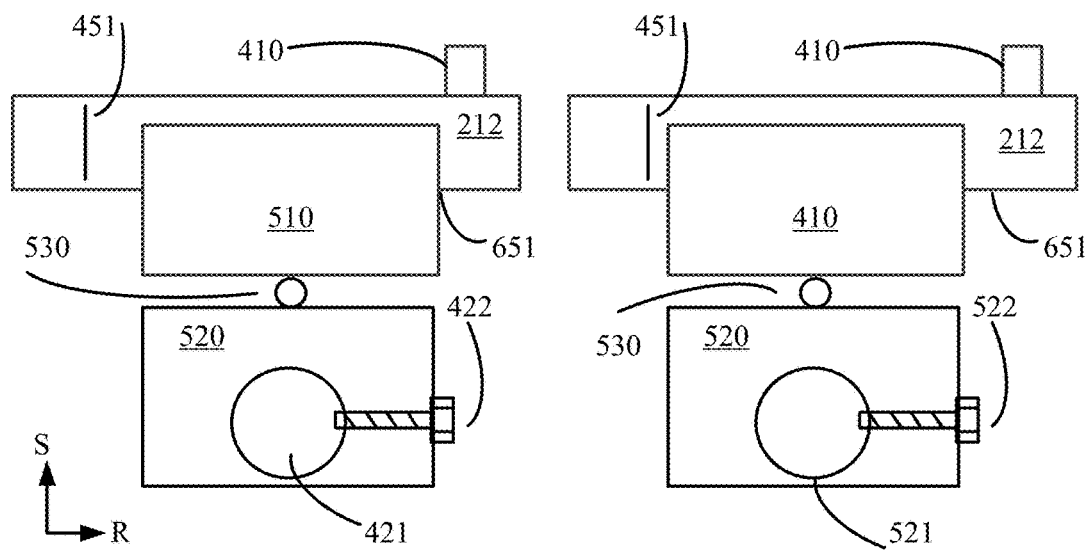
Fig. 5H Pre-axial movement
Fig. 5I Post-axial movement
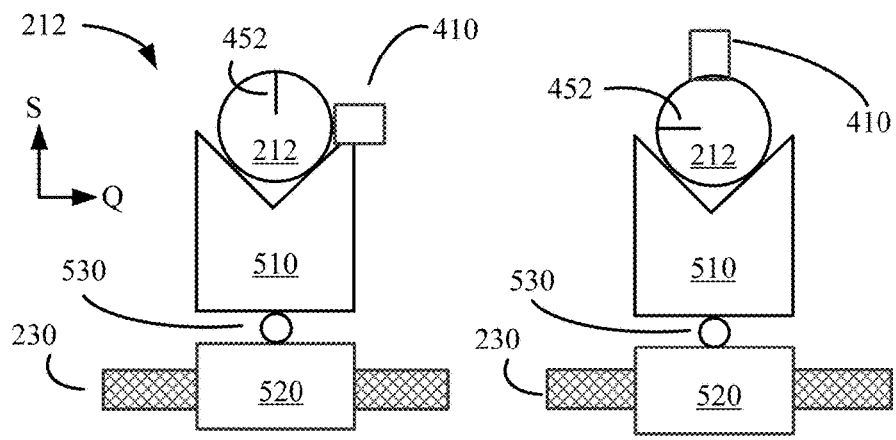
Fig. 5J – Pre-Axial rotation
Fig. 5K – Post-Axial rotation

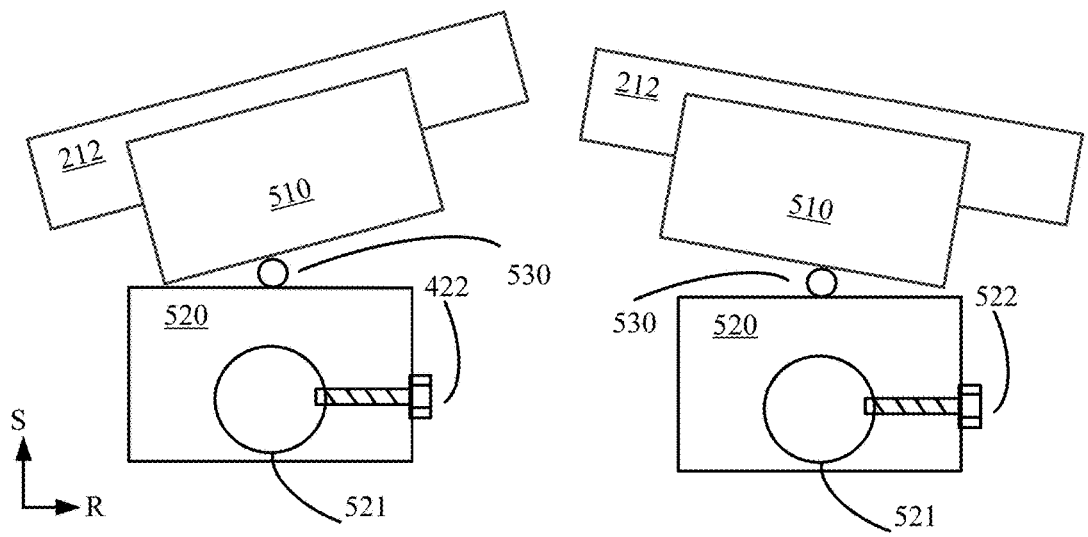
Fig. 5L Pre-elevation rotation
Fig. 5M Post elevation rotation
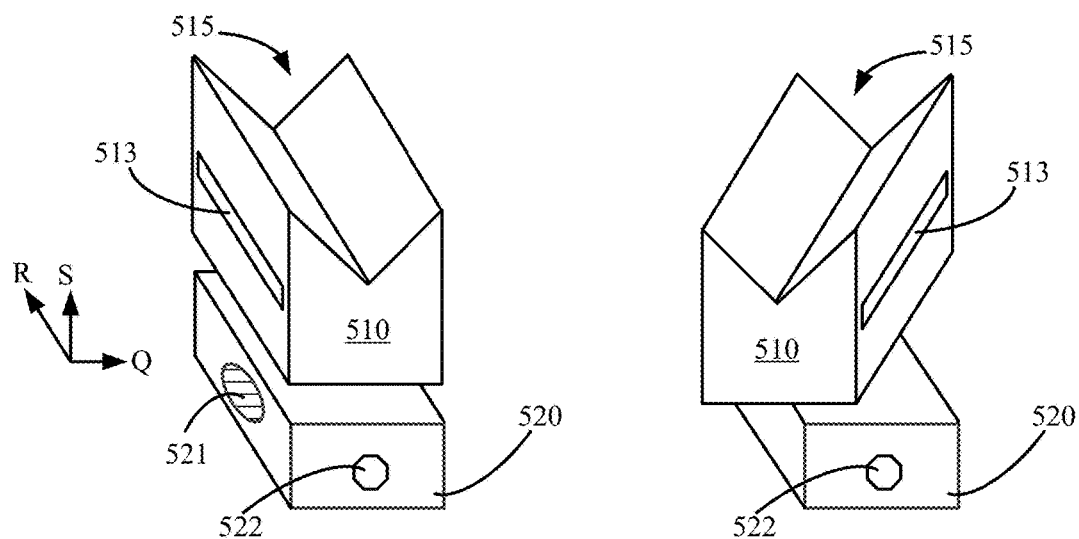
Fig. 5N Pre-rotation
Fig. 5O Post rotation

OPTICAL PROBE WITH CRASH PROTECTION AND PROBE CLIPS

PRIORITY

This patent application claims priority from the following United States provisional patent applications:

Provisional U.S. patent application No. 62/309,172, filed Mar. 16, 2016, entitled, "Optical Probe with Crash Protection and naming Gurpreet Singh, Paul Racine, John Langlais, and Jie Zheng as inventors [practitioners' file 3740A/1041], provisional U.S. patent application No. 62/309,212, filed Mar. 16, 2016, entitled, "Adjustable Optical Probe Clip" and naming Gurpreet Singh, John Langlais, and Jie Zheng as inventors [practitioners' file 3740A/1042], provisional U.S. patent application No. 62/309,202, filed Mar. 16, 2016, entitled, "Thermally Optimized Optical Probe Head" and naming Gurpreet Singh, John Langlais, and Jie Zheng as inventors [practitioners' file 3740A/1043], and provisional U.S. patent application No. 62/309,274, filed Mar. 16, 2016, entitled, "Optical Probe with Adjustable Probe Platform" and naming Gurpreet Singh, John Langlais, and Jie Zheng as inventors [practitioners' file 3740A/1044].

The disclosures of all of the above four provisional patent applications are incorporated herein, in their entireties, by reference.

TECHNICAL FIELD

The present disclosure relates to coordinate measuring machines and, more particularly, to coordinate measuring machines that use optical probe technologies.

BACKGROUND ART

Coordinate measuring machines (CMMs) are used for accurately measuring a wide variety of work pieces. For example, CMMs can measure critical dimensions of aircraft engine components, surgical tools, and gun barrels. Precise and accurate measurements help ensure that their underlying systems, such as an aircraft in the case of aircraft components, operate as specified.

SUMMARY OF VARIOUS EMBODIMENTS

A first embodiment of a probe head for a coordinate measuring machine includes a mount, and a probe platform movably suspended from the mount. The probe platform is configured to support at least one probe. A sensor (e.g., a motion sensor or displacement sensor) is operably coupled between the mount and the probe platform such that displacement of the probe platform relative to the mount is transmitted to the sensor. In various such embodiments, the mount, the sensor and the probe platform are configured so that contact between the probe platform, or a probe coupled to the probe platform, and an object causes a change in an electrical property of the sensor.

To that end, the sensor is, in some embodiments a kinematic seat, and the change in an electrical property is a break in continuity between conductive portions of the kinematic seat.

Some embodiments include a stem between the probe platform and the sensor. The stem couples the probe platform to the sensor and spaces the probe platform from the sensor.

Some embodiments include a housing movably suspended from the mount and at least partially surrounding the probe platform, or a probe suspended from the probe platform. In various embodiments, the housing may include a rigid plate and a rigid apron, the plate coupled to the mount, and the apron movably coupled to the plate. In some embodiments, the apron is removably coupled to the plate. The housing may optionally include a mechanical interface to allow an optical cable to pass through the housing to reach an optical probe suspended from the boom.

In some embodiments, the housing may be coupled to the probe platform via a rod configured to transmit mechanical force or motion from the housing to the sensor via the probe platform. The rod may be isolated from the housing via a hysteretic coupling, the hysteretic coupling configured to mitigate transmission, from the housing to the sensor, of mechanical motion in the housing resulting from thermal stress. For example, the hysteretic coupling may include an aperture in the housing, and a fastener passing through the aperture and securing the housing to the rod. More specifically, in some embodiments the diameter of the aperture is greater than the diameter of the fastener such that the fastener may pass through the aperture without touching an inner surface of the aperture.

In some embodiments, the housing has a weight and is movably suspended from the mount by a spring, the spring configured to support, from the mount, the weight of the housing. The spring may configured to hold the housing in a nominal position, relative to the mount, in the absence of displacement of the housing by contact between the housing and the object. Moreover, the spring may be configured to return the housing to the nominal position, relative to the mount, after removal of contact between the housing and the object.

In another embodiment, a coordinate measuring machine for measuring a workpiece includes a base configured to support the workpiece during measurement, and an arm movable relative to the base, the arm configured to support at least one probe for measuring the workpiece under control of a controller. The coordinate measuring machine includes a probe platform coupled to the arm and configured to support the at least one probe; and a sensor operably coupled between the arm and the probe platform such that displacement of the probe platform relative to the arm is transmitted to the sensor. The arm, the sensor and the probe platform are configured so that contact between the probe platform, or a probe coupled to the probe platform, and an object causes a change in an electrical property of the sensor. The controller is configured to move the arm in response to the change in the electrical property of the sensor so as to mitigate damage to the probe platform or a sensor coupled to the probe platform.

Some embodiments also include a housing movably suspended from the arm and at least partially surrounding the probe platform, or a probe suspended from the probe platform. In some embodiments, the housing is coupled to the probe platform via a rod, the rod configured to transmit mechanical force or motion from the housing to the sensor via the probe platform. For example, in some embodiments, the housing rod is coupled to the rod via a hysteretic coupling, the hysteretic coupling configured to mitigate transmission, from the housing to the sensor, of mechanical motion in the housing resulting from thermal stress.

In some embodiments, the housing is movably suspended from the arm by a spring configured to hold the housing in a nominal position, relative to the arm, in the absence of contact between the housing and the object. Moreover, in some embodiments, the spring is operably coupled to the mount and is configured to return the housing to the nominal position after removal of contact between the housing and the object.

BRIEF DESCRIPTION OF THE DRAWINGS

The foregoing features of embodiments will be more readily understood by reference to the following detailed description, taken with reference to the accompanying drawings, in which:

FIGS. 2A-2L schematically illustrate features of embodiments of a probe head;

FIGS. 3A-3C schematically illustrate an embodiment of a kinematic seat in various positions;

FIG. 3D schematically illustrates an alternate embodiment of a sensor;

FIGS. 5A-5O schematically illustrate another embodiment of a probe clip;

DETAILED DESCRIPTION OF SPECIFIC EMBODIMENTS

Various embodiments provide crash detection for a CMM probe head. To that end, a probe may move relative to its probe head in the event of a crash or other undesired contact between the probe and another object. After moving in response to the impact event, the probe favorably returns to its desired position.

In other embodiments, probe clips allow a user to adjust the position of a CMM probe relative to the portion of the CMM from which the probe is suspended. Such a probe clip may be configured to enable the user to easily and accurately place the probe clip onto a coordinate measuring machine. Moreover, various like or similar probe clips may be configured to movably and adjustably secure an optical probe to the CMM. To that end, the probe clip may have a probe seat, for holding the probe, movably coupled to a clamp segment by an adjustable joint. The clamp segment movably couples the probe seat to a probe platform on the CMM.

In related embodiments, a re-configurable probe platform (e.g., a "boom") allows substantial freedom for a user to adjust the location and orientation of one or more probes suspended from a probe head. Among other geometries, the probe platform may be circular, or C-shaped. In other embodiments, the probe platform includes a multi-positional connection device, such as an articulated arm, or a segmented arm connected by hinges.

In yet other embodiments, a probe head is configured to resist measurement errors caused by thermal changes. For example, the structures of the probe head, and probes, may be made from similar materials (e.g., steel, stainless steel). In that case, illustrative embodiments may match thermal time constants of features so they respond to changes in temperature on the same or similar time scale.

Figure 1A:
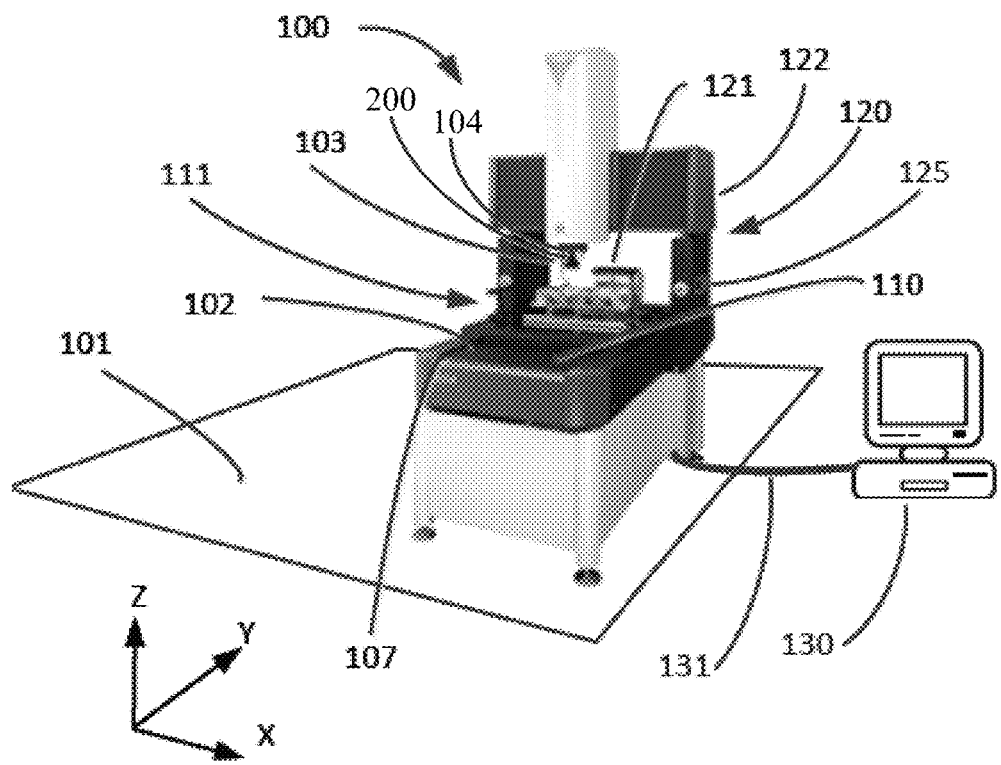
FIGS. 1A and 1B schematically illustrates an embodiment of a CMM.

FIG. 1A shows one type of coordinate measurement machine 100 (hereinafter "CMM 100") that may be configured in accordance with illustrative embodiments. As known by those in the art, the CMM 100, which is supported on a floor 101 in this figure, measures an object or workpiece 150 on its bed/table/base (referred to as "base 102"). Generally, the base 102 of the CMM 100 defines an X-Y plane 110 that typically is parallel to the plane of the floor 101.

To measure an object on its base 102, the CMM 100 has movable features 122 arranged to move a measuring device 103, such as an optical probe on a probe head 200, coupled with a movable arm 104. Alternately, some embodiments move the base 102 (e.g., or a portion of the base 102, such as a moveable table 107) with respect to a stationary measuring device 103. Either way, the movable features 122 of the CMM 100 manipulate the relative positions of the measuring device 103 and the object (or calibration artifact) with respect to one another to obtain the desired measurement. Accordingly, the CMM 100 can measure the location of a variety of features of the object or artifact.

The CMM 100 has a motion and data control system 120 (or "controller" or "control logic") that controls and coordinates its movements and activities. Among other things, the control system 120 includes a computer processor 121 and the noted sensors/movable features 122. The computer processor 121, which may include a microprocessor, may have on-board digital memory (e.g., RAM or ROM) for storing data and/or computer code, including instructions for implementing some or all of the control system operations and methods. Alternately, or in addition, the computer processor 121 may be operably coupled to other digital memory, such as RAM or ROM, or a programmable memory circuit for storing such computer code and/or control data.

Alternately, or in addition, some embodiments couple the CMM 100 with an external computer (or "host computer") 130. In a manner similar to the control system 120, the host computer 130 has a computer processor such as those described above, and computer memory in communication with the processor of the CMM 100. The memory is configured to hold non-transient computer instructions capable of being executed by the processor, and/or to store non-transient data, such as data acquired as a result of the measurements of an object on the base 102.

Among other things, the host computer 130 may be a desktop computer, a tower computer, or a laptop computer, such as those available from Dell Inc., or even a tablet computer, such as the iPad™ available from Apple Inc. The host computer 130 may be coupled to the CMM 100 via a hardwired connection, such as an Ethernet cable 131, or via a wireless link, such as a Bluetooth link or a Wi-Fi link. The host computer 130 may, for example, include software to control the CMM 100 during use or calibration, and/or may include software configured to process data acquired during a calibration process. In addition, the host computer 130 may include a user interface configured to allow a user to manually operate the CMM 100.

Because their relative positions are determined by the action of the movable features 122, the CMM 100 may be considered as having knowledge about data relating to the relative locations of the base 102, and the object or artifact, with respect to its measuring device 103. More particularly, the computer processor 121 and/or computer 130 control and store information about the motions of the movable features 122. Alternately, or in addition, the movable features 122 of some embodiments include sensors that sense the locations of the table 107 and/or measuring device 103, and report that data to the computers 121 or 130. The information about the motion and positions of the table and/or measuring device 103 of the CMM 100 may be recorded in terms of a two-dimensional (e.g., X-Y; X-Z; Y-Z) or three-dimensional (X-Y-Z) coordinate system referenced to a point on the CMM 100.

Figure 1B:
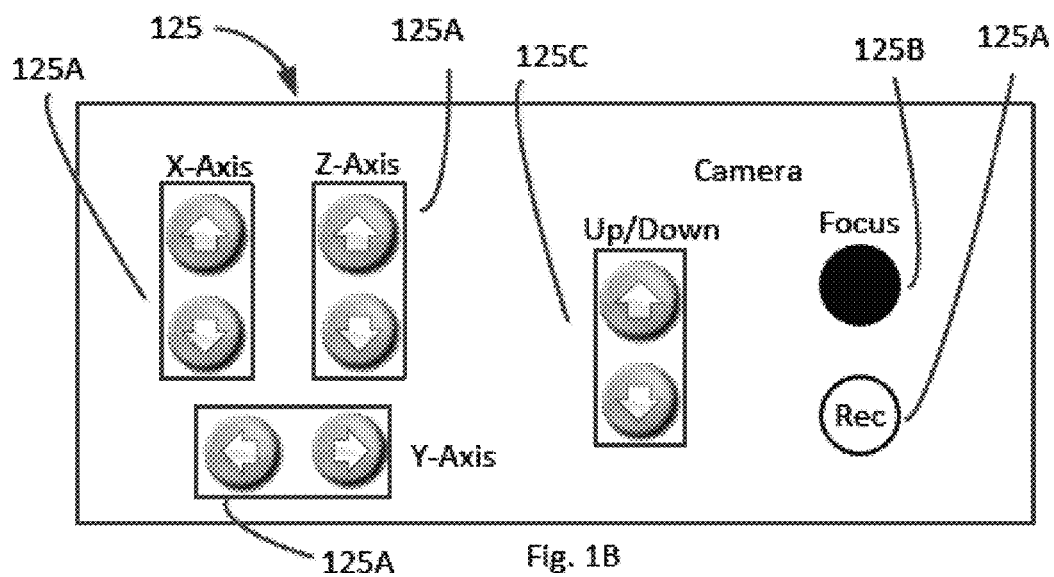

Some CMMs also include a manual user interface 125, such as that shown generically in FIG. 1A and as further schematically illustrated in FIG. 1B. As shown, the manual user interface 125 may have control buttons 125A and knobs 125B that allow a user to manually operate the CMM 100. Among other things, the interface 125 may enable the user to change the position of the measuring device 103 or base 102 (e.g., with respect to one another) and to record data describing the position of the measuring device 103 or base 102.

In a moving table CMM, for example, the measuring device 103 may also be movable via control buttons 125C. As such, the movable features 122 may respond to manual control, or be under control of the computer processor 121, to move the base 102 and/or the measuring device relative to one another. Accordingly, this arrangement permits the object being measured to be presented to the measuring device 103 from a variety of angles, and in a variety of positions.

Probe Head with Crash Protection

Figure 2A:
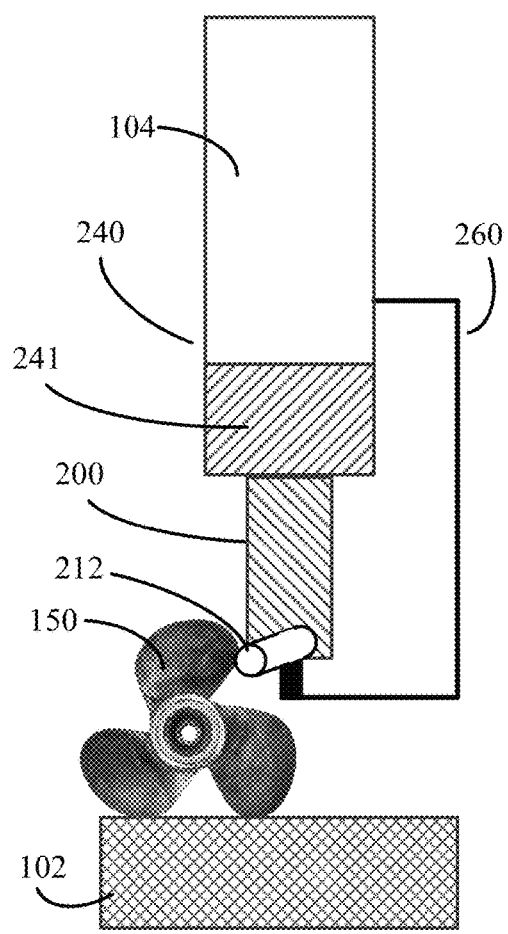
Figure 2B:
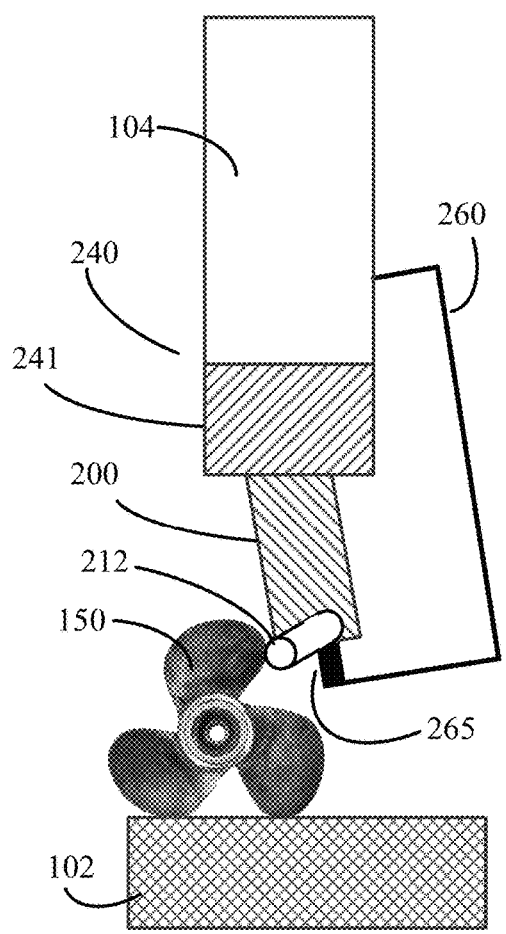

FIGS. 2A-2B schematically illustrate a probe head 200 of the CMM 100 while measuring the above noted workpiece 150 which, in this example, is a propeller. In this embodiment, the probe head 200 includes a mount 240 configured to couple the probe head 200 to the movable arm 104 of the CMM 100. In some embodiments, the mount 240 may be an integral part of the arm 104. In other embodiments, the probe head 200 may be configured to couple to a stationary part of the CMM 100. Among others, this may be applicable to embodiments of the CMM 100 in which the table 107 moves the workpiece 150 relative to the probe 212 or probe head 200. In some embodiments, the mount 240 includes electrical connections, for example, to provide power to a sensor 241 or probes 212. Alternatively or in addition, these electrical connections may couple with communication circuits to provide communications capability between: A) the control system 120 or the computer 130, and B) the sensor 241 or one or more probes 212. Details of the sensor 241, probes 212 and electrical connections are discussed below.

Figure 2C:
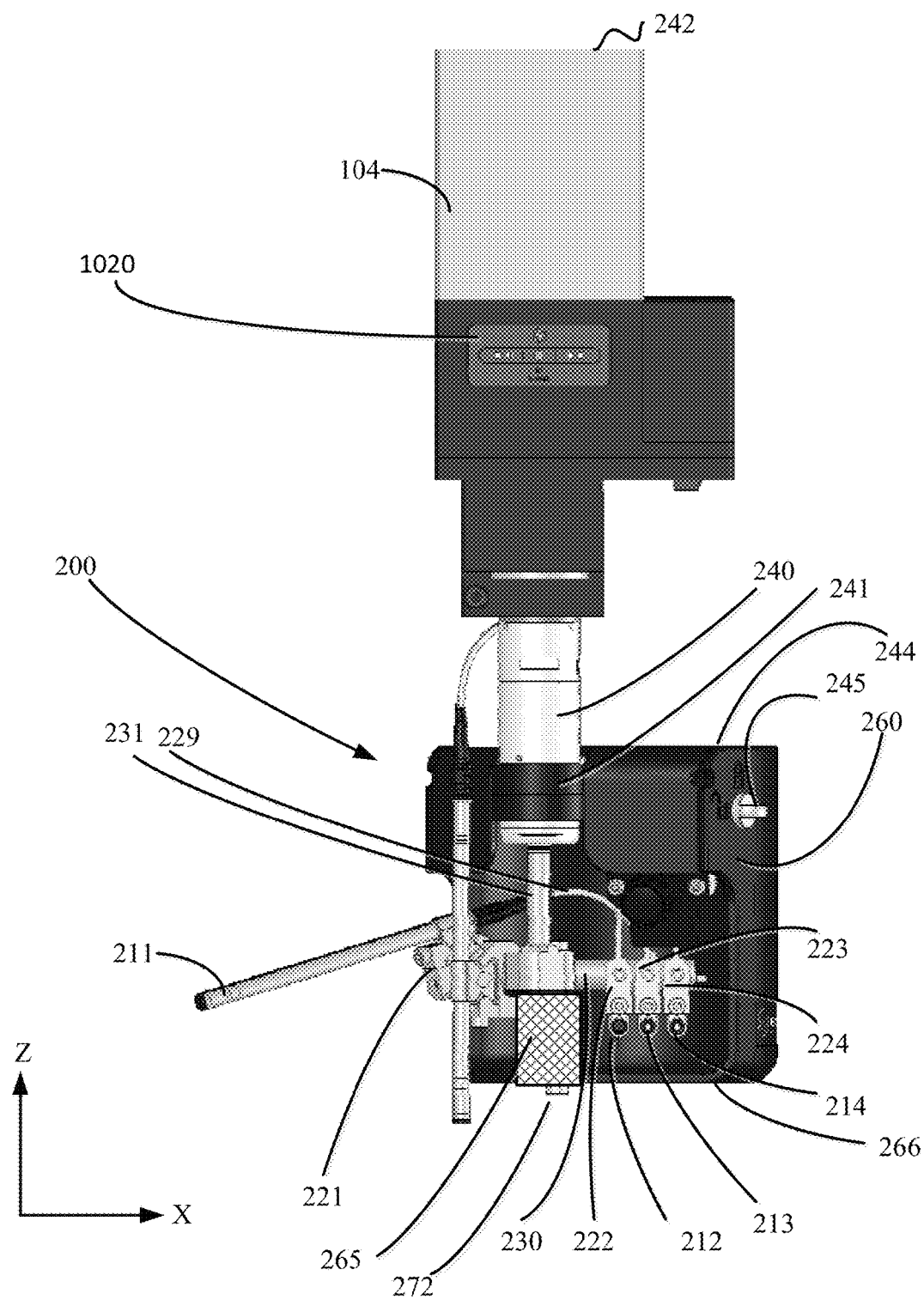

The probe head 200 also includes a probe platform 230, as schematically illustrated in FIG. 2C, movably coupled to the mount 240, and configured to support one or more probes 212 for use in measuring the workpiece 150. The probe 212 may be removably coupled to the probe platform 230 by any of a variety of conventional means, or unconventional means such as with probe clips 200 (see FIG. 5A and others, discussed below). In illustrative embodiments, the probe 212 may be considered to be removably coupled to a probe platform 230, for example, if the probe 212 can be affixed to the probe platform 230, and/or removed from the probe platform 230, without damaging the probe 212 or the probe platform 230.

Some embodiments also include a housing 260, as described further below, to provide physical protection to the probe platform 230, probes 212 or other components of the probe head 200 against contact with another object. In some embodiments, the probe head 200, probe platform 230, and probes (211-214, see FIG. 2C) are be made from identical materials (e.g., steel, stainless steel), so that they respond to changes in temperature on the same or a similar time scale, and/or with matched thermally-induced changes in dimensions.

In some embodiments, some or all of the probe head 200, boom 230, and probes (e.g., the probe 212), are be made from different materials, but materials with matched thermal time constants (e.g., coefficients of thermal expansion-"CTEs") and matched thermal lengths. Accordingly, features made of such materials are expected to respond to changes in temperature on the same or a similar time scale, with matched thermally-induced changes in lengths. Illustrative embodiments may form each of the probe head 200, probe platform 230 and probes 211-214 from a plurality of different materials having a composite CTE that match as noted above. For example, the probe platform 230 may be formed from multiple materials that have a composite CTE that matches those of the probe head 200 and the probes 211-214.

The sensor 241 is operably coupled between the mount 240 and the probe platform 230, such that motion of (or displacement of) the probe platform 230 relative to the mount 240 is transmitted to the sensor 241. For example, the probe platform 230 may be in a nominal position, as schematically illustrated in FIG. 2A, when the CMM 100 is in normal operation, or not in use. However, when a portion of the probe head 200 (e.g., the probe platform 230; the probe 212; the housing 260) contacts an object (e.g., the workpiece 150; another part of the CMM 100, a user, or another object near the CMM 100), the probe head 200 moves (i.e., is displaced) relative to the mount 240. To illustrate this, FIG. 2B schematically shows the probe head 200 displaced from its nominal position. The displacement, or motion, of the probe head 200 is transmitted to the sensor 241 through, e.g., the probe platform 230. In illustrative embodiments, any contact that causes the sensor 241 to detect such displacement may be referred to as "dynamic" contact.

The mount 240, the sensor 241, and the probe platform 230 are thus configured so that dynamic contact between A) the probe platform 230 or the probe 212 coupled to the probe platform 230, and B) an object causes a change in an electrical and/or mechanical property of the sensor 241. In this way, the sensor 241 can detect a crash between the probe head 200 and another object. The CMM 100 may react to a crash in one or more ways, as described below.

A Specific Embodiment of a Probe Head

Figure 2D:
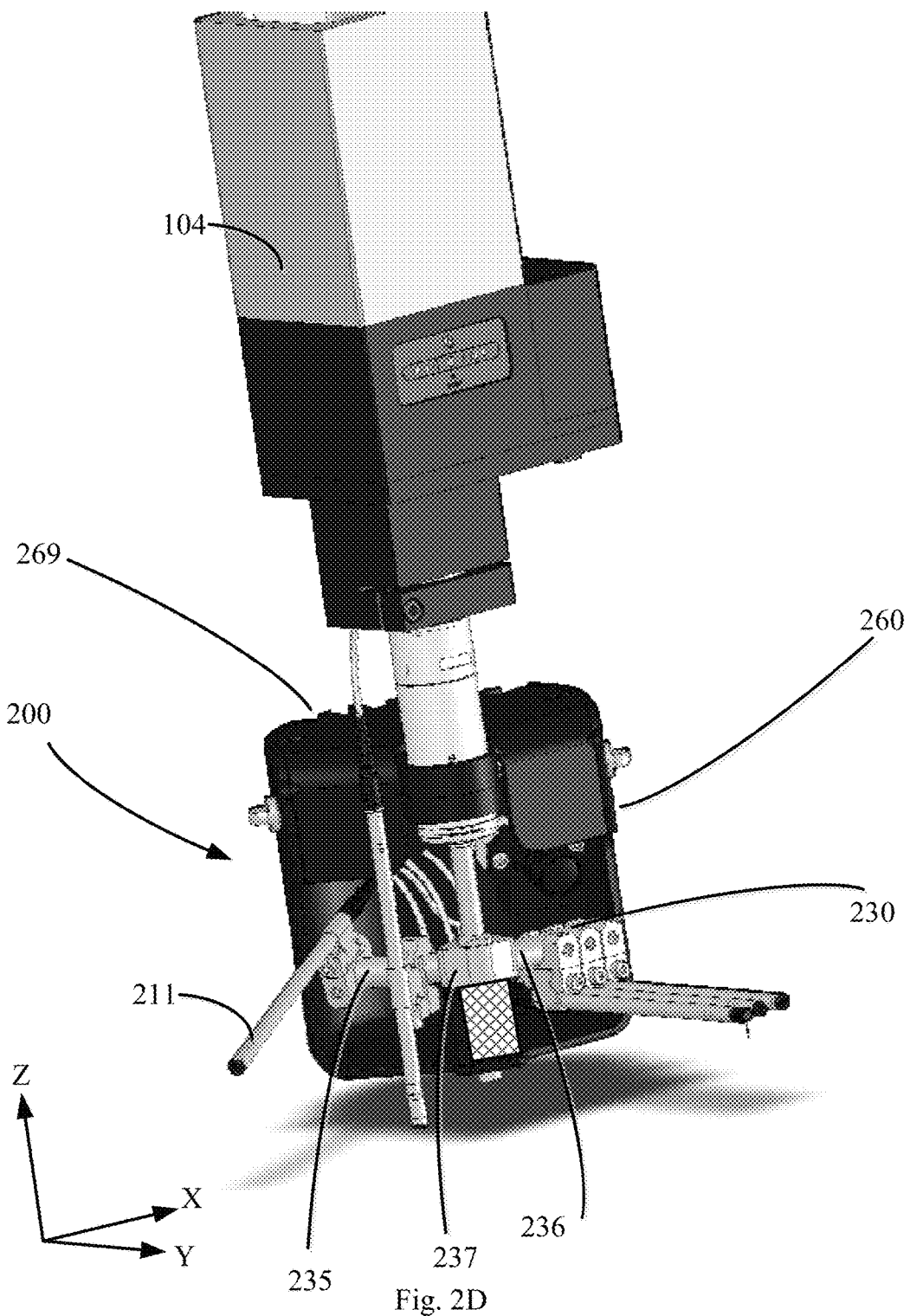
Figure 2E:
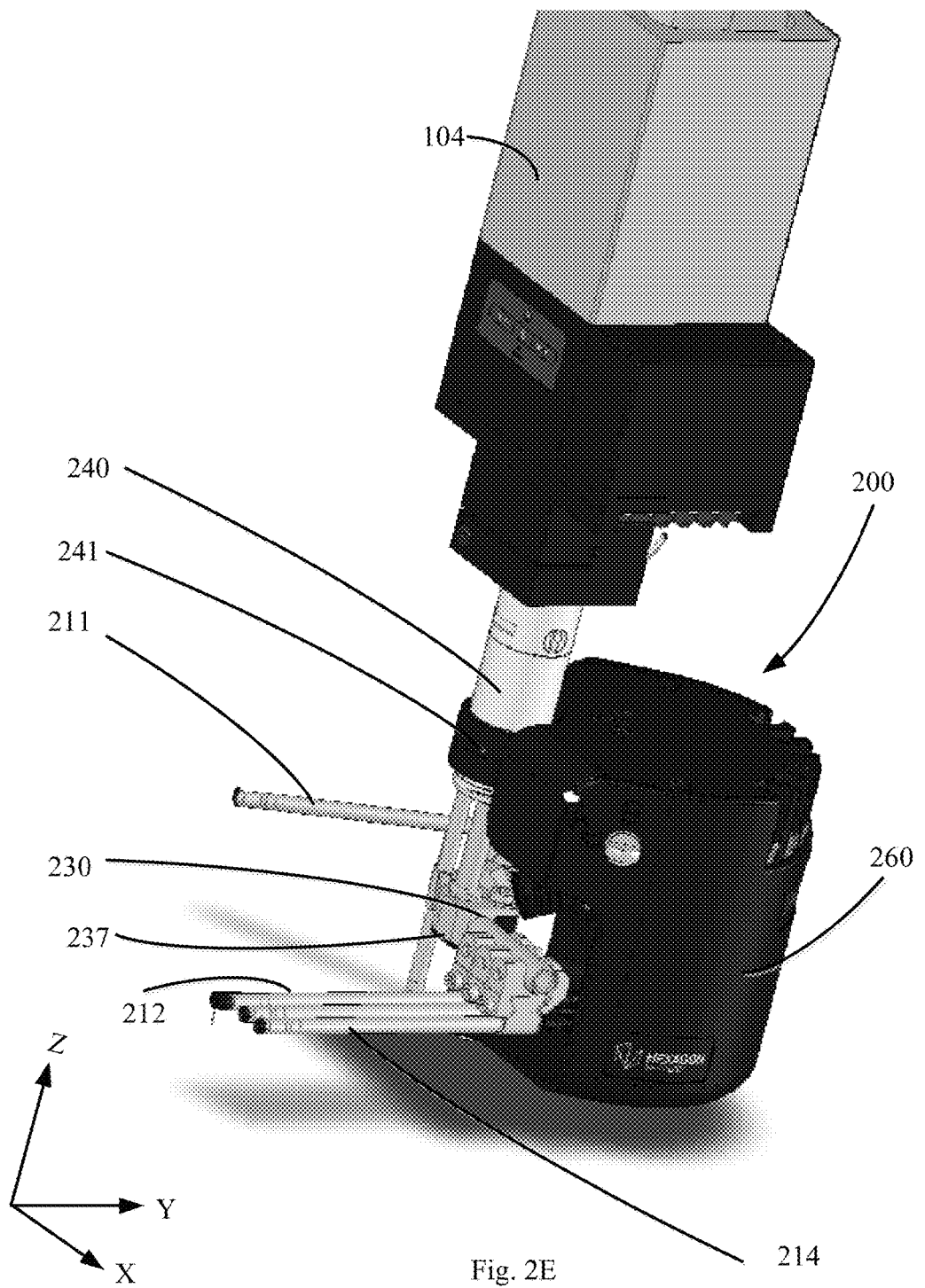

FIGS. 2C-2E schematically illustrate three different close-up views of an embodiment of the probe head 200 of FIGS. 2A and 2B. These views show the probe head 200 with several probes (211, 212, 213, and 214) suspended from the probe platform 230 (e.g., also referred to as a boom) by corresponding probe clips (221, 222, 223, and 224). Each probe is in electrical communication with the controller 120 via a cable 229, and the sensor 241 is in electrical communication with the controller 120 via cable 228, as schematically illustrated in FIG. 2L.

The boom 230 is shown as being L-shaped, although it may have other shapes/geometries, and in some embodiments has an adjustable shape. For example, the boom 230 may include a plurality of components that are movable relative to each other. In some embodiments, the boom 230 may simply include two boom segments (235, 236) connected by joint 237 (FIGS. 2D and 2E), which may be a simple hinge or ball joint, to name two examples. As such, in this embodiment, the boom 230 can include two boom segments (235, 236) that can move relative to each other at least as permitted by the joint 237. The embodiment of FIGS. 2C and 2D may have such a two-segmented boom 230 with a simple hinge 237, so that the two boom segments 235, 236 of that embodiment may rotate about the Z-axis.

Other embodiments, however, may permit additional freedom of movement. For example, the segments 235, 236 may be coupled so that they have more than two degrees of freedom of motion. Specifically, one or both of the boom segments may be configured to extend linearly along their respective lengths, and/or to rotate about an axis defined by those lengths.

Those skilled in the art may select a joint mechanism 237 permitting the noted movement. For example, among other things, the connection mechanism 237 between boom segments 235, 236 may include a hinge, ball and socket connection, telescoping connections, etc.

Before use, the user may re-configure or re-orient the boom segments 235, 236 to more effectively operate with the workpiece 150 and overall CMM 100. Accordingly, the CMM 100 thus may use this re-configurable boom 230, movable probe clips 200, or both to more effectively measure a workpiece 150.

The boom 230 is, in turn, movably suspended from the sensor 241 which, as noted above, may be positioned in the mount 240. This connection preferably is made so that the boom 230 is movable with respect to the mount 240. In general, the sensor 241 may detect motion or displacement of the boom 230 by sensing changes in electrical properties of circuit elements in physical (although not necessarily direct) contact with the boom 230. In illustrative embodiments described below, the sensor 241 includes a kinematic seat 300, for example as discussed with regard to FIGS. 3A-3D.

In this embodiment, a stem 231 suspends the boom 230 from the kinematic seat 300. As such, the length may determine, in part, the sensitivity of the crash detector feature. The kinematic seat 300 is thus configured to detect motion of the boom 230 relative to the mount 240. These simplified illustrations schematically illustrate the function of a kinematic seat 300.

As noted above, some embodiments also include the rigid housing 260 (or "shroud" or "apron"), which is movably coupled to the mount 240, for example by one or more pivot fasteners 245 that allow the housing 260 to move relative to the mount 240. The housing 260 may be coupled to the mount 240 by a plate 244. In the embodiment of FIGS. 2C-2H, the housing 260 is essentially cylindrical, although it does not have a complete cylindrical surface so as to allow the probes (211-214) to extend beyond the housing 260. This embodiment of the housing 260 has its axis of symmetry parallel to the long dimension of the stem 231, although other shapes and/or orientations are possible.

Figure 2I:
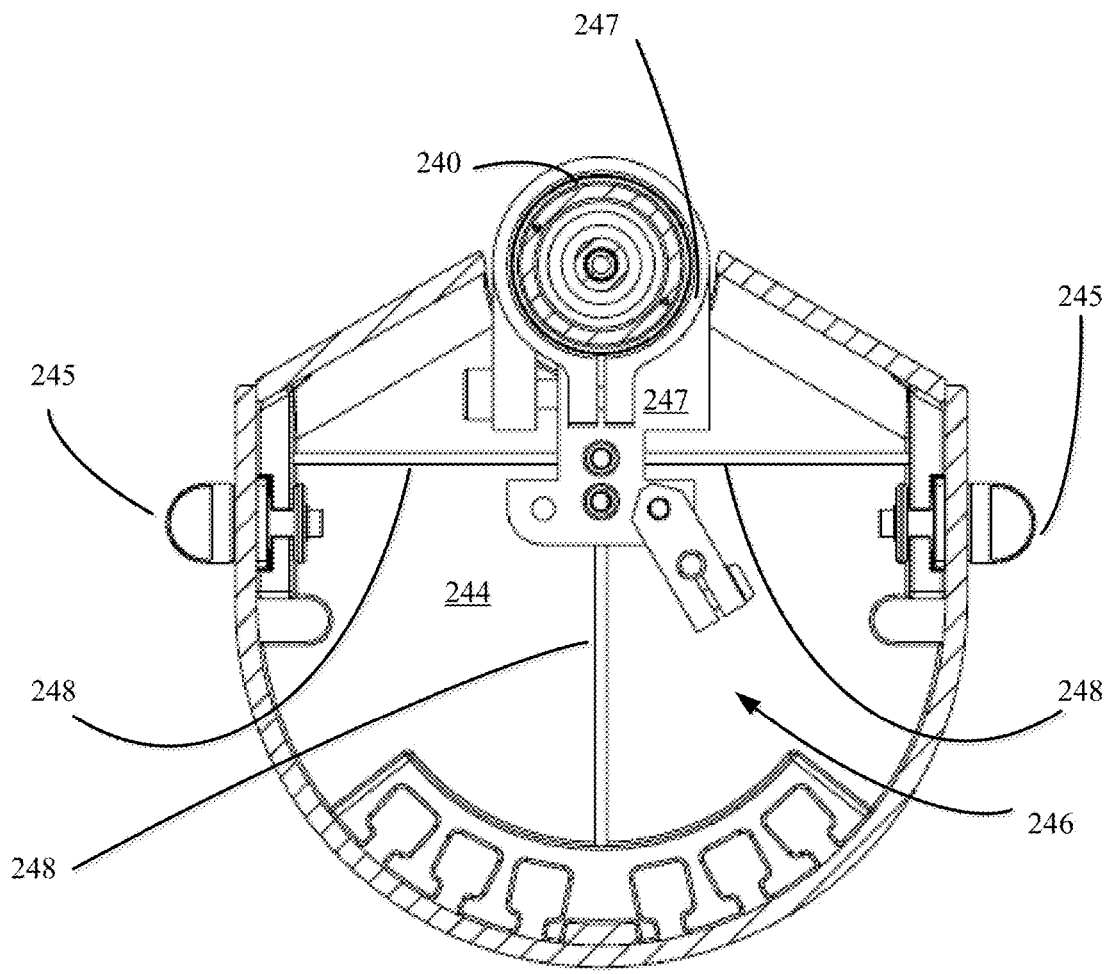

Some embodiments couple the housing 260 to the mount 240 via a movable element (e.g., a stress absorbing spring system) 246, as schematically illustrated in FIG. 2I. The spring system 246 is coupled to the mount 240 by a collar 247, and in this embodiment includes three flexible elements 248, in a "T" configuration, positioned between the mount 240 and pivot fasters 245 so that the plate 244 is coupled to the mount 240 by the spring 246. In this way, thermal expansion of the plate 244 is at least partially absorbed by the motion of the spring 246 so that the plate 244 is not over-constrained and does not push against the mount 240. Such interaction, without the spring 246, undesirably can cause the circumferential edge of the plate 244 to move away from the mount 240, which can transmit to the boom 230 via a rod 265. The spring 246 favorably mitigates transmission of thermal expansion from the housing 260 to the boom 230 and probes 212 coupled to the boom 230.

In addition, the spring 246 allows the housing 260 to move relative to the mount 240, for example when the housing 260 contacts, or is in contact with, an object, such as the workpiece 150, a different portion of the CMM 100, an operator, or a foreign body. Moreover, the spring 246 may cause the housing 260 to return to a nominal position (e.g., as in FIG. 2A) from a displaced position (e.g., FIG. 2B) after the contact with the object is removed.

The housing 260 is physically coupled to the sensor 241 via a rod (or "strut") 265. In the embodiments of FIGS. 2C-2E, the rod 265 is coupled to the sensor 241 via the boom 230 and thus via the stem 231. Consequently, motion of the housing 260 relative to the mount 240 (e.g., if the housing 260 contacts an object or another part of the CMM) is transmitted to the sensor 241, which detects the crash similar to the crash detection describe above.

In some embodiments, the rod 265 is isolated from the housing 260 via a hysteretic mechanical coupling 270 that mitigates or prevents transmission of thermal stress (e.g., mechanical motion in the housing arising from a change in the housing temperature) from reaching the sensor 241, but which transmits to the sensor motion or displacement of the housing 260 due to in impact of the housing with an object. Preferably, this arrangement thus ensures that changes in the housing temperature do not cause a corresponding change in an important electrical property of the sensor 241. For example, in some embodiments, as schematically illustrated in FIG. 2F, FIG. 2G and FIG. 2H, the hysteretic coupling 270 has an aperture 271 in the bottom 266 of housing 260, and a fastener 272 passing through the aperture 271 securing the housing 260 to the rod 265. The diameter 274 of the aperture 271 is larger than the outside diameter 273 of the fastener 272. As such, the radial sides 274 of the fastener 272 do not contact the side (inner wall) 275 of the aperture 271, ensuring that lateral (X-axis) motion of the housing 260 due to thermal expansion is not transmitted to the fastener 271.

In some embodiments, the housing 260 includes a mechanical interface 269 (FIG. 2D) that allows an optical cable to pass through the housing 260 to reach an optical probe suspended from the boom 230. In some embodiments, the mechanical interface 269 is in the form of an aperture passing through the housing 260.

In the event that the CMM 100 senses a crash (an impact event) between the probe head 200 or the probe platform, or the probe 212, and another object, the CMM 100 may take a variety of actions, such as immediately stopping the motion of the probe head 200, or the motion of a CMM table; repeating one or more previous measurements; discarding previous measurements; and/or notifying a CMM operator that a crash occurred. For example, the sensor 241 may be coupled with the controller 120 that takes the appropriate action after it receives a signal from the sensor 241 indicating a crash.

Figure 2J:
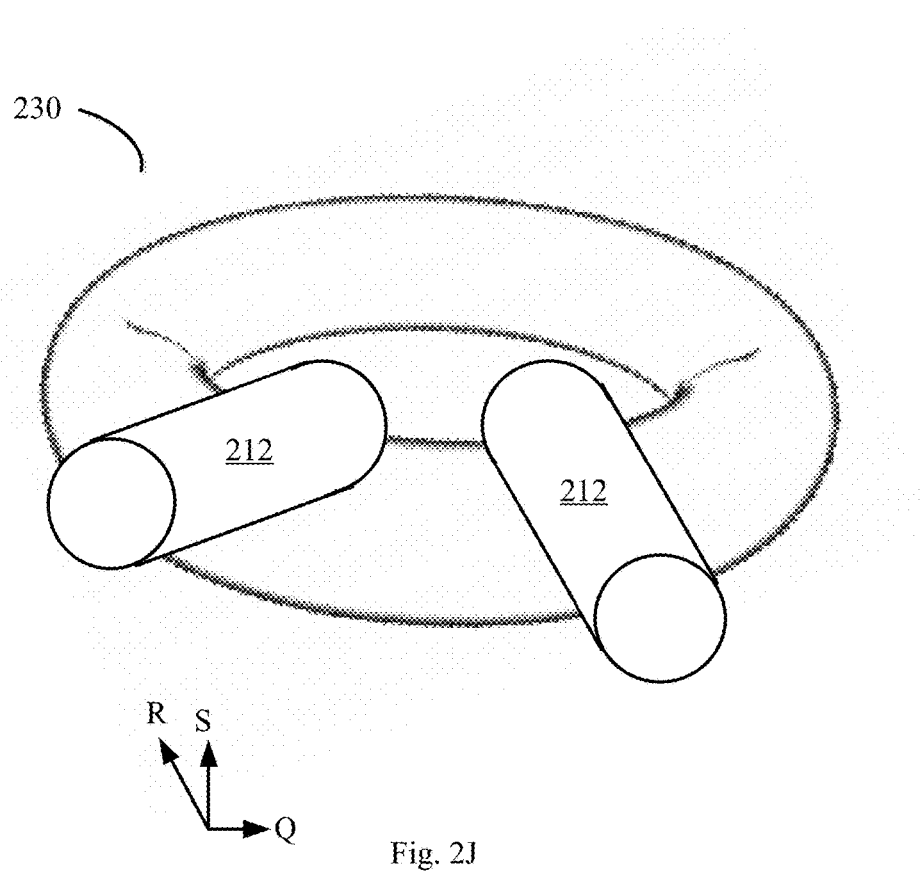
Figure 2K:
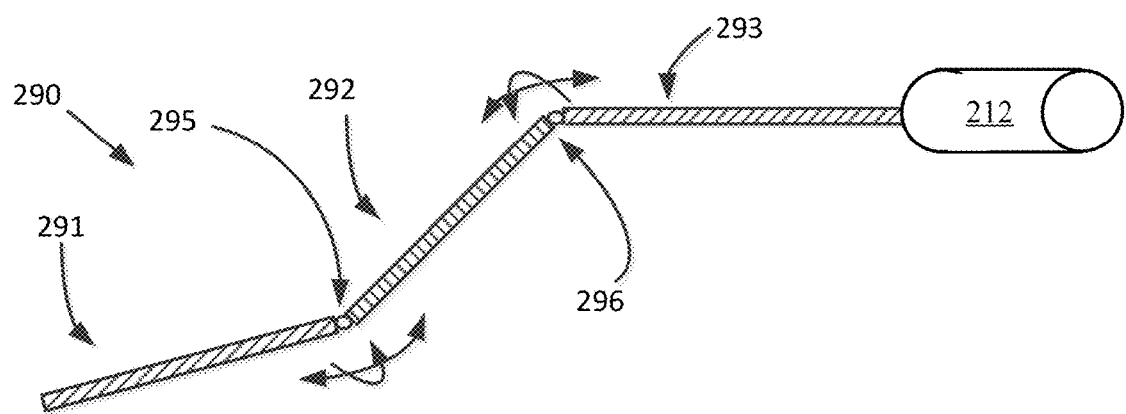
Figure 2L:
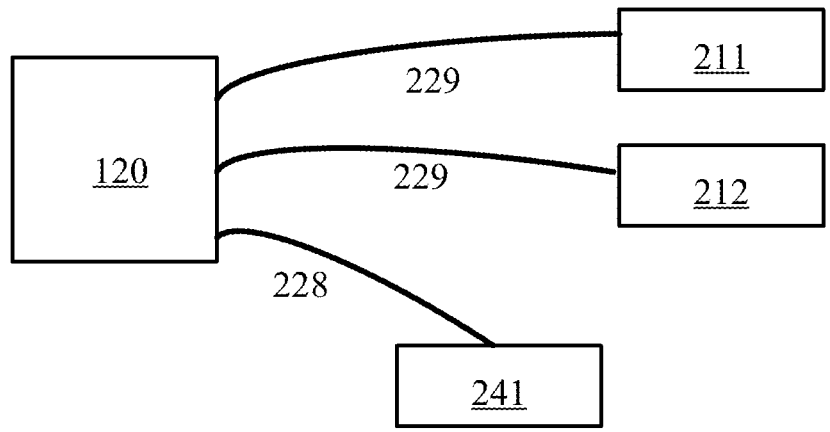

FIG. 2J and FIG. 2K: Toroid and Arm

FIG. 2J schematically illustrates an alternate embodiment of the boom 230. In this embodiment, the boom 230 is in the shape of a torus (i.e., it is toroidal), while in other related embodiments, the boom 230 may have a "C" shape. Such embodiments permit a user to suspend the probe 212 substantially anywhere along the boom 230, thus providing a user a great deal of flexibility in where to place the probe 212, and where to place multiple probes relative to one another relative to a 360 degree area. For example, the embodiment of FIG. 2J is schematically illustrated with two probes 212, although the boom 230 could accommodate more or fewer probes 212.

In some embodiments, the probe 212 is coupled to the boom 230, or to the mount 240, by a flexible arm 290 as schematically illustrated in FIG. 2K. The arm 290 can have any number of segments, and may be extensible and/or articulated to provide any desired number of degrees of freedom. The arm 290 in this example has three arm segments (291, 292 and 293) coupled by joints (295 and 296) that allow several degrees of freedom with respect to the other joints. Accordingly, this embodiment provides to a probe 212 a plurality of degrees of freedom relative to the boom 230 or mount 240, as indicated by the double-headed arrows near the joints 295, 296 and probe 212. In addition, one or more of the arm segments 291, 292, and 293 may be extendable axially along the long dimension of the segments themselves. As shown, the probe 212 couples to arm segment 293, while the arm 290 couples to the boom 230, or mount 240, at segment 291.

Other embodiments may have a single boom segment (e.g., one of segments 291, 292, or 293) that can move about the other portions to which it is connected. Various other embodiments may have more than two or three boom segments 291, 292, or 293, each of which are configured to be adjustable relative to one another as noted above.

The arm 290 may thus allow the probe 212 to be moved in and around a workpiece 150. As suggested, other embodiments may have more or fewer arm segments and moveable joints, and may have more or fewer degrees of freedom.

FIGS. 3A-3D: Sensors; Kinematic Seat

FIGS. 3A-3C schematically illustrate one of the above noted kinematic seat 300. In this embodiment, the kinematic seat 300 includes a T-shaped bracket 310 having a base portion 312 orthogonally coupled with a cross-bar 311. The cross-bar 311 may have an elongated shape, or form a region having a large surface area (e.g., the top face of a circular shaped member). At least the cross-bar 311 is electrically conductive. In other embodiments, however, both the cross-bar 311 and base portion 312 are electrically conductive.

The kinematic seat 300 also includes several conductive seats. In FIGS. 3A-3C, only two such seats are schematically illustrated (321, 323), but various embodiments may have three, four, or more such conductive seats. The cross-bar 311 is mechanically biased against the seats (321, 323) by a spring 330, which pushes against the mount 240. When no force, or a small force, is applied to the base portion 312, the cross-bar 311 is in physical and electrical contact with the conductive seats (321, 323). When in this state, an electrical current passes from one seat (321) through the cross-bar 311 to the other seat (323), where the current is detected by a continuity detector 350.

However, a force applied to the base portion 312 of the bracket 310 (which base portion 312 may include the stem 231, or which may be physically coupled to the stem 231) causes the cross-bar 311 to break its electrical contact with one or more of the seats (321, 323). This causes the continuity detector 350 not to detect a current flowing through the seats (321, 323) and cross-bar 311, or alternately, to detect an absence of such a current. For example, in FIG. 3B, a force in the +X direction has caused the cross-bar 311 to lose contact with the seat 323. Consequently, the CMM knows that the probe head 200 (or other coupled CMM part) has crashed into something by moving the in −X direction. Note that, although FIG. 3B schematically illustrates the kinematic seat 300 operating in the X-axis, the same principle applies in the Y-axis (which is orthogonal to the X-axis and the Z-axis) using seats (e.g., 321, 323) and the cross-bar (311) in that axis, with the result that the kinematic seat 300 can detect crashes in either the +/−X-axis and/or the +/−Y-axis.

In FIG. 3C, a force in the +Z direction has caused the cross-bar 311 to lose contact with both seat 321 and seat 323. Consequently, the CMM knows that the probe head has crashed into something by moving the in −Z direction.

Consequently, the kinematic seat 300 is a type of sensor that detects motion or displacement of the bracket 310. In practice, the bracket 310 is physically coupled to the boom 230, which is physically coupled to the probes (211-214). This coupling is made so that the kinematic seat 300 detects motion of the bracket 310 caused by contact between any of the bracket 310, boom 230, probes (211-214), housing 260, or other feature of the probe head 200, and another object. As such, the kinematic seat 300 may be referred to as a "crash detector."

Although the kinematic seat 300 of the above embodiments detects motion of the boom 230 by make-or-break electrical connections between the cross-bar 311 and the seats 321, 323, the sensor 241 may operate differently. For example, some implementations of the sensor 241 may detect motion of the cross-bar 311 by coupling the cross-bar 311 to one or more piezo resistors (represented by 326, 328 in FIG. 3D) such that physical stress (e.g., compression; tension) imposed by the cross-bar 311 on one or more of the piezo resistors 326, 328 causes a change in the electrical resistance of the piezo resistor(s), which change may be detected by detector 350. In another example, some sensor 241 may detect motion of the cross-bar 311 by coupling the cross-bar 311 to one or more variable capacitors (also represented by 326, 328 in FIG. 3D) such that physical motion of the cross-bar 311 causes a change in the electrical capacitance of at least one of the variable capacitors that is detected by the detector 350. In some piezo resistor embodiments, the cross-bar 311 need not be conductive. Microelectromechanical systems ("MEMS devices") also may be used to aid in sensing. For example, the sensor 241 could be an accelerometer or gyroscope configured to detect a motion of, or change in motion of, the arm 140 or probe head 200.

Figure 4A:
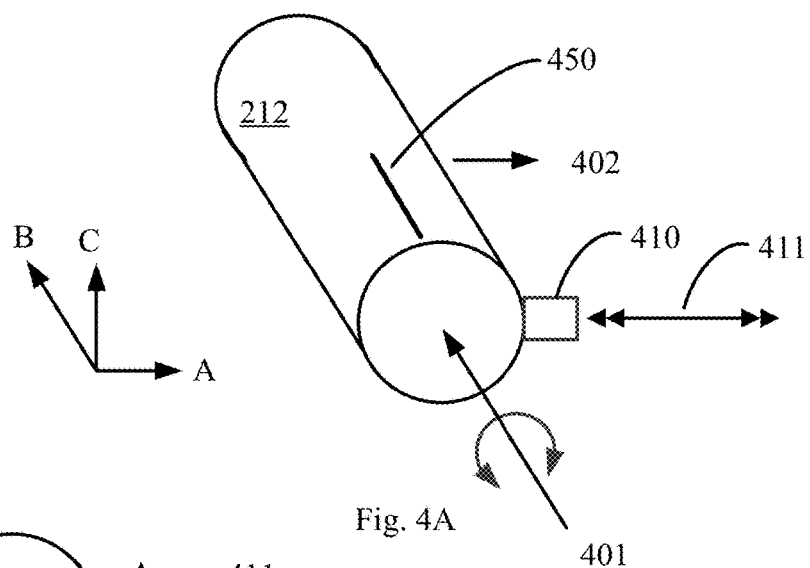
FIGS. 4A-4C schematically illustrate an embodiment of a probe.
Figure 4B:
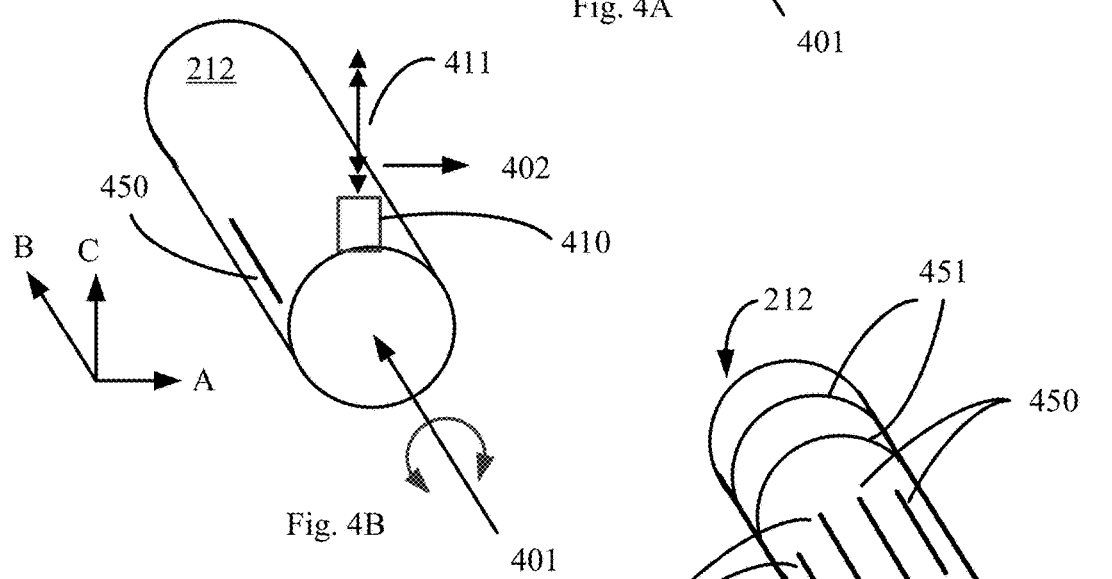

FIGS. 4A-4B: Optical Probes

FIGS. 4A-4B schematically illustrate the noted elongated optical probe 212, which defines an elongated axis (401, parallel to the B-axis), and an axis 402 perpendicular (or normal) to the elongated axis 401 (and parallel to the A-axis). The embodiment of FIGS. 4A-4B includes an optical probe that measures the workpiece 150 by illuminating the workpiece with light projected from the probe 212, and reflected back to the probe 212 by the workpiece. To that end, the probe 212 has an optical transceiver 410 configured to transmit light and receive a reflection of that light (the light and its reflection are schematically illustrated by double-headed arrow 411). Note that the direction of the light (FIG. 4A) may be changed by rotation of the probe 212 around its elongated axis 401 (FIG. 4B). Alternately, or in addition, some probes transmit light and receive reflections from the probe 212 along axis 401.

Figure 4C:
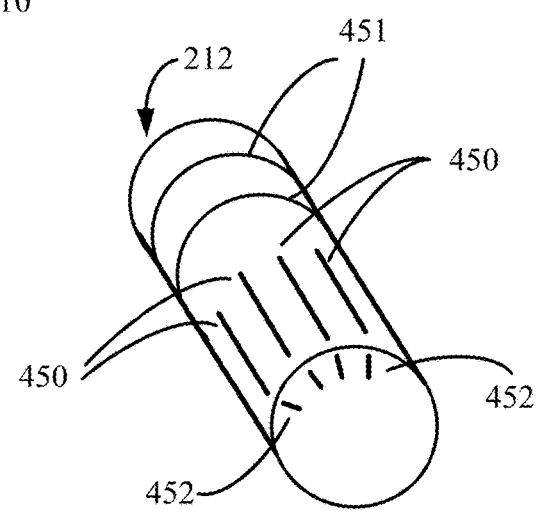

FIG. 4C schematically illustrates an embodiment of the probe 212 with adjustment indicia. Some measurements by the CMM 100 may require that a probe be at or near a certain position, or in a particular orientation, for example relative to a probe clip, in order to operate correctly. To that end, some embodiments of probes 212 include axial indicia 450 at one or more locations along their length to indicate, to an operator, the radial position of the probe 212 within a probe clip (e.g., how the probe 212 is turned within a probe seat 515, discussed below with regard to FIGS. 5A-5B). Alternately, or in addition, some embodiments of probes 212 include axial indicia 452 at one or more locations on one or both of its end faces to indicate, to an operator, the radial position of the probe 212 within a probe clip.

Alternately, or in addition, some probes 212 may include radial indicia 451 at one or more locations around their circumference, to indicate, to an operator, the axial position of the probe 212 within a probe clip (e.g., where the probe is positioned along the seat 515).

FIGS. 4A-4C are shown and described with respect to three orthogonal axes labeled A, B and C. Although axes A, B and C may align with axes X, Y and Z, and/or axes Q, R and S in other figures, such alignment is not required and is not a limitation of various embodiments.

FIGS. 5A-5O schematically illustrate another embodiment of a probe clip

FIGS. 5A-5C schematically illustrate additional details of illustrative embodiments of an embodiment of the probe clips 221, 222, 223 and 224, using probe clip 222 for illustrative purposes.

Many of the features of the probe clip 222 and probe 212 are movable relative to a boom 230 on which the probe clip is mounted. Some motions may be described as linear in that a feature moves along an axis, while other such motions may be described as rotational in that a feature rotates about an axis.

Some of the figures include illustrative axes (e.g., some sets of axes show three dimensions Q, R and S of FIGS. 5A-5O, while others show only two axes, such as Q and S, or R and S) for reference purposes. For purposes of describing certain features, the following terms are defined relative to the reference axes:

"Elevation" refers to rotation about the Q axis (e.g., in a vertical, S-R plane);

"Radial" refers to direction about the R axis (e.g., about the elongated axis of the probe); and "Axial" refers to motion along the R axis (e.g., along the elongated axis of the probe).

"Azimuth" refers to rotation about the S axis (e.g., rotation in in the Q-R plane).

The probe clip 222 has a probe seat segment 510 and a clamp segment 520 coupled together by movable joint 530. The movable joint 530 is adjustable to allow the position or orientation of the probe seat segment 510 to be adjustable relative to the clamp segment 520, e.g., in both azimuth and elevation. In some embodiments, the joint 530 may be a ball joint or spherical joint. Such a joint may be configured to allow the above noted probe seat 515, holding a probe 212, to rotate in at least two orthogonal planes relative to the clamp segment 520, thereby allowing a user to adjust the location and/or orientation of the probe 212 relative to the clamp segment 520.

To support the probe 212 the probe seat segment 510 includes a concave (e.g., v-shaped) shaped seat 515, and a spring-loaded retainer 540 to couple the probe 212 into the seat 515. The spring-loaded retainer 540 is coupled to the probe seat segment 510 at a slot 413 (FIG. 5B), and may include a retainer seat 541. In addition, the seat 515 and the retainer seat 541 preferably are positioned in opposition and cooperate to secure the probe 212 into the seat 515. In some embodiments, if the probe 212 is displaced from its position in the seat 515, for example due to contact between the probe 212 and an object, the retainer 540 returns the probe 212 to its intended seated position after the contact is terminated. The nature of the probe seat 515 and spring retainer 540 is such that the probe 212, in some embodiments, returns to a prescribed position in the probe seat 515 with a significant degree of accuracy, such as would allow a measurement process to continue.

FIG. 5C schematically illustrates a side-view of the clamp segment 520, to clearly show an aperture 521 configured to couple the probe clip 222 to the boom 230. The diameter of the aperture 521 preferably is slightly larger than the diameter of the boom 230. Accordingly, the boom 230 fits into and through the aperture 521 such that the clamp base 520 slides onto the boom 230. Although the aperture 521 is schematically illustrated as a circle, the aperture 521 may have other shapes, such as square, rectangular, or irregular shapes, and may generally match the shape of a corresponding boom 230. Some embodiments also include a set screw 522 passing through the clamp base 520 and into the aperture 521. When coupled, the set screw 522 may be tightened against the boom 230 positioned through the aperture 521 to secure the clamp base 520 to the boom 230.

The elevation of the probe 212 in the probe clip 222 (e.g., in probe seat segment 510) may be adjusted by rotating the clamp segment 520 around the boom 230. For example, a user may loosen the set screw 522, move the clamp segment 520 to a new desired position (e.g., by rotating the clip 222 around the Q axis), and tighten the set screw 522 to fix the clip 222 in the new position.

The joint 530 is selectively movable, and may be fixed into a selected position, e.g., under the control of a user. The joint 530 may rotate, e.g., about the S axis, the Q axis or the R axis, and its length may be extended or reduced along the S axis.

In the examples below, the position of the probe 212 relative to the boom 230 is changed by manipulating:

1) the probe 212 relative to the clip 222, 2) portions of the clip 222 relative to other portions of the clip 222, and/or 3) the clip 222 relative to the boom.

Although illustrated separately, any of the features described below may be made and used in combination to adjust the location and orientation of a probe 212 relative to a boom.

Linear Motions

FIG. 5D and FIG. 5E schematically illustrate the probe clip 222 in two positions: an initial position in FIG. 5D, and a subsequent position in FIG. 5E, after the probe clip 222 has translated along the boom 230 in the Q direction. As shown in FIG. 5D, the probe clip 222 is nearer to boom position 512 than to position 511, while in FIG. 5E the probe clip 222 is nearer (i.e., has moved to be nearer) to boom position 511 than to boom position 512.

To move the probe clip 222, a user may loosen the set screw 522 and slide the clip 222 along the boom 230 to the subsequent position. When in the appropriate boom position, the user may then tighten the set screw 522 to secure the clip 222 to the boom 230.

FIG. 5F and FIG. 5G schematically illustrate one embodiment of the probe 212 in the probe seat 515 of the seat segment 510. In FIG. 5G, the seat segment 510 has been extended, relative to the clamp segment 520, by extension of the joint 530 along the S axis. Among other things, the joint 530 may include a threaded section so that the seat segment 510 may be moved relative to the clamp segment 520 in a screw-like fashion. As another example, the joint 530 may include a scissor-like mechanism enabling the seat segment 510 to move relative to the clamp segment 520 by expanding or contracting the scissor-like mechanism.

FIG. 5H and FIG. 5I schematically illustrate another embodiment of the probe 212 in the probe seat 515 of the seat segment 510. More specifically, FIG. 5H and FIG. 5I schematically illustrate the probe 212 in two positions: an initial position in FIG. 5H in which point 551 on the probe 212 is near the seat segment 510, and a subsequent position in FIG. 5I in which point 551 on the probe 212 is farther from the seat segment 510, after the probe 212 has been moved axially (i.e., along its elongated axis, along the V-shaped groove 515)

Rotational Motions

FIG. 5J and FIG. 5K schematically illustrate another embodiment of the probe clip 222 containing the probe 212 in the probe seat 515. More specifically, FIG. 5J and FIG. 5K schematically illustrate the probe 212 in two positions: an initial position in FIG. 5J, and a subsequent position in FIG. 5K. As shown, in FIG. 5K, the probe 212 has been rotated (radial motion) from its position in FIG. 5J about its elongated axis 301.

FIG. 5L and FIG. 5M schematically illustrate another embodiment in which the probe 212 is positioned at two distinct elevations: an initial elevation in FIG. 5L, and a subsequent elevation in FIG. 5M, after the seat segment 510 has been rotated (about the Q axis) relative to the clamp segment 520. In this embodiment, the joint 530 is rotatable about the Q axis.

FIG. 5N and FIG. 5O schematically illustrate yet another embodiment in which the seat segment 510 has two distinct azimuth positions: an initial position in FIG. 5N, and a subsequent position in FIG. 5O, after the seat segment 510 has been rotated (about the S axis) relative to the clamp segment 520. In this embodiment, the joint 530 is rotatable about the S axis.

In some embodiments, two or more probes may be coupled to a boom 230 to allow the CMM 100 to measure a workpiece 150 from a variety of different directions. For example, in FIG. 2A, three probes (212, 213 and 214) are adjacent to one another and coupled to the boom 230. The orientation of the probe 212 relative to its probe clip 222 may be set so that the light transmitted from and received by the probe 212 is along the Q axis in the –Q direction, so that the probe 212 can illuminate and measure a workpiece 150 when the probe is located, relative to the workpiece 150, in the +Q direction. Similarly, the orientation of the probe 214 relative to its probe clip 224 may be set so that the light transmitted from and received by the probe 212 is along the Q axis in the +X direction, so that the probe 214 can illuminate and measure the workpiece 150 when the probe is located, relative to the workpiece 150, in the –Q direction. The light transmitted from and received by the probe 213 is along the R axis, so that the probe 213 can illuminate and measure the workpiece 150 when the probe is located, relative to the workpiece 150, in the R axis.

In this way, the CMM 100 can measure the workpiece 150 by moving the probe head 200 to various positions along the Q and R axis, and use the probes 212, 213 and 214 independently (e.g., one at a time) depending on the location of the probe head and probes relative to the workpiece 150. Some embodiments, however, may use one or more of the probes 212, 213 and 214 at the same time. Because the location and orientation of each of the probes 212, 213 and 214 relative to the boom 230 and relative to one another, is adjustable as described above, a user can avoid having to remove a probe and replace it with another probe when a probe of a different orientation is required or desired. Rather, the user can simply adjust and adapt the location and orientation of a probe using the features described herein. This reduces the need for a variety of different probes and clamps, and makes operation of the CMM faster and more efficient.

FIGS. 5A-5O are shown and described with respect to three orthogonal axes labeled Q, R and S. Although axes Q, R and S may align with axes X, Y and Z, and/or axes A, B and C, in other figures, such alignment is not required and is not a limitation of any embodiment.

Figure 6:
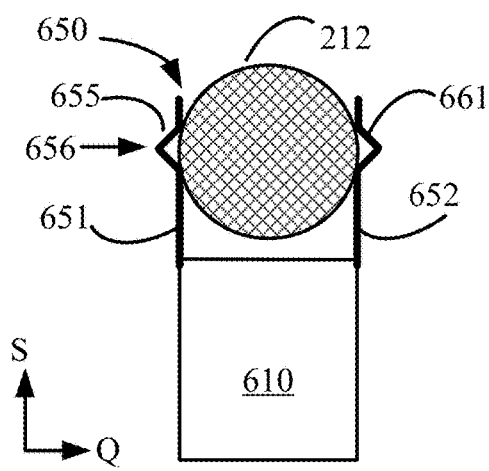
FIG. 6 schematically illustrates another embodiment of a probe clip.

FIG. 6 schematically illustrates another embodiment (650) of a probe clip, in which two arms 651, 652 extend from a base 610. The base 610 may be a probe seat that couples to a clamp segment in any of the ways schematically illustrated by probe seats 510 and clamp segments 520 in FIGS. 5A-5O, or could be a clamp segment 520 configured to couple directly to a probe platform. One of the arms (e.g., the arm 651) includes a v-shaped seat (655) that defines an axis (656; parallel to the Q-axis in FIG. 6) that extends in a direction that does not intersect the base 610. The second arm 652 has a retainer seat 661, and acts as a spring-loaded retainer to secure the probe 212 into the v-shaped seat 655.

Figure 7:
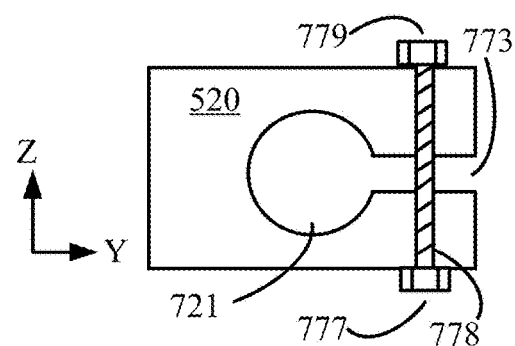
FIG. 7 schematically illustrates another embodiment of a probe clip.

Another embodiment of the clamp segment 520 is schematically illustrated in FIG. 7, and includes an aperture 721 that includes an opening 773 to one, such that the aperture 721 forms an open "C" shape. The clamping screw 777, when tightened into the clamp segment 520 across the opening 773, reduces the gap width of the opening 773 such that the clamp segment 520 acts as a clamp to secure the clamp segment 520 to the boom 230. To that end, the clamping screw 777 may screw into a threaded aperture 778 in the clamp segment 520. Alternately, in some embodiments, the (optionally threaded) aperture 778 may pass completely through the clamp segment 520, across the opening 773, and the clamping screw 777 is secured to the clamp segment 520 by a nut 779.

Figure 8:
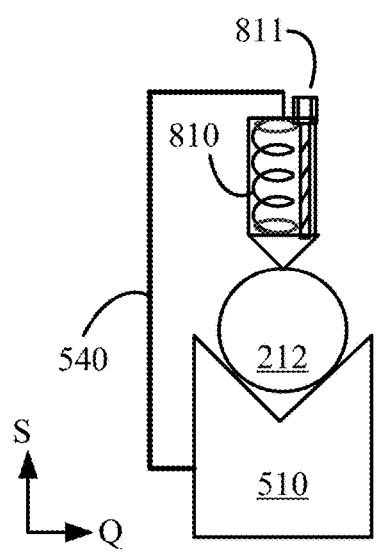
FIG. 8 schematically illustrates another embodiment of a probe clip.

In some embodiments, a pre-loaded spring 810 secures the probe 212 to the probe seat segment 510, as schematically illustrated in FIG. 8. In such embodiments, changes in mechanical properties due to thermal stress are absorbed by the pre-loaded spring 810, rather than being allowed to distort the probe 212 (or other structure, which also can distort the probe 212). In such embodiments, if thermal expansion of features (e.g., probe seat segment 510; retainer 540) increases force on the probe 212, the pre-loaded spring 810 flexes to absorb the force, thereby reducing the transmission of that force increase to the probe 212. Similarly, if thermal contraction of such features decreases force on the probe 212, the pre-loaded spring 810 flexes to increase its force on the probe 212. Accordingly, the probe 212 should remain aligned in the appropriate manner.

In some embodiments, the pre-loaded spring 810 includes a screw 811 that adjusts (e.g., to increase and decrease) the force applied by the pre-loaded spring 810.

In some embodiments, the pre-loaded spring 810 is sufficiently flexible to absorb thermally-induced forces, yet sufficiently rigid to transmit, to a sensor 241 in the mount, motion or displacement of the probe 212 relative to the mount 240 in the event of a crash of the probe into another object. A person of ordinary skill in the art, having possession of this disclosure, can establish or adjust the flexibly and rigidity of the pre-loaded spring 810 according to the application in which the pre-loaded spring 810 is used.

Figure 9A:
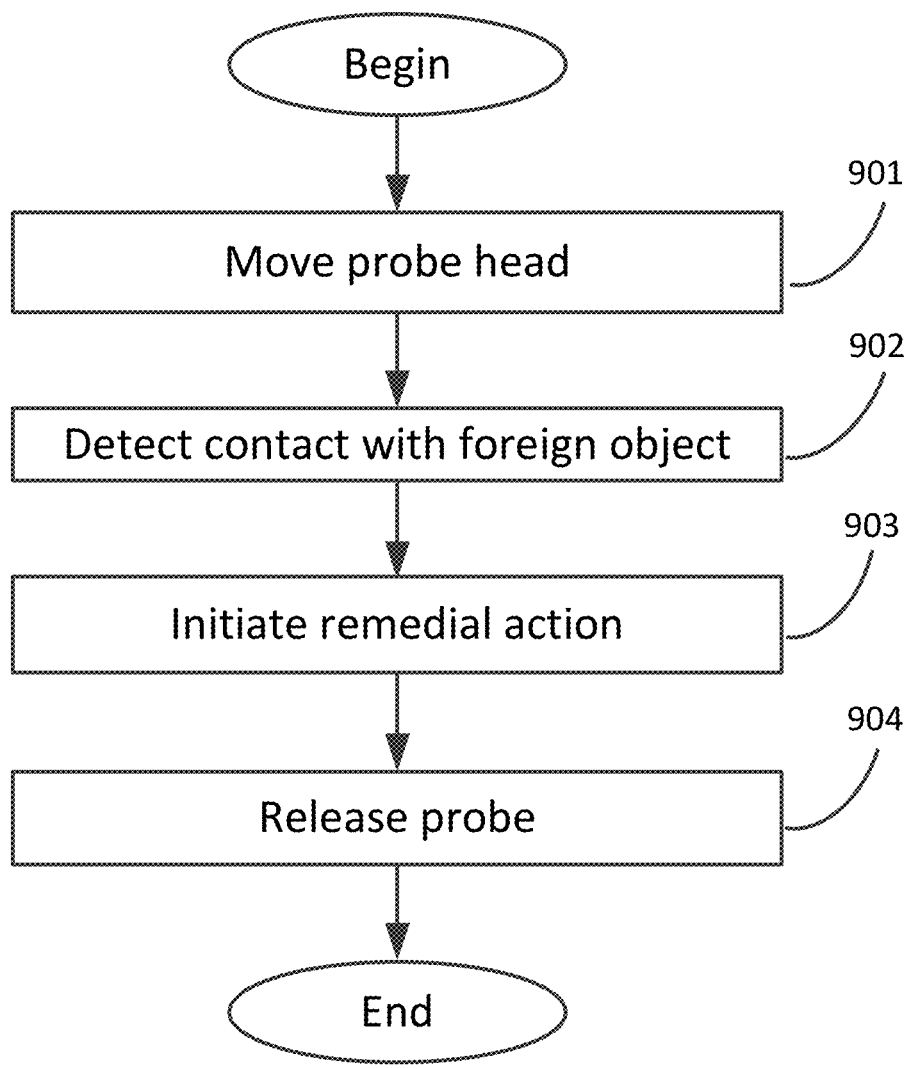
FIG. 9A is a flow chart that illustrates a method of responding to a crash.

FIG. 9A is a flow chart illustrating a method by which some embodiments of the CMM 100 react to detecting a crash between a probe head 200, or a probe 212, and another object.

The CMM 100 moves the probe 212, or the probe head 200, relative to another part of the CMM 100, at step 901.

For example, the CMM 100 may move the arm 104 relative to a base 102, or may move the base 102 (e.g. a table) relative to the probe 212. In any case, the probe 212 or probe head 200 may unintentionally contact an object in a crash.

At step 902, the CMM 100 detects the crash, for example by detecting motion or displacement of a probe head 200 relative to an arm, 104. In some embodiments, the above noted sensor 241 is coupled to the controller 120 such that the controller 120 detects 1) a signal from the sensor indicating motion or displacement of a probe head 200 relative to an arm 104 by a signal, and/or 2) a change in a signal from the sensor 241.

In response to detecting motion or displacement of a probe head 200, the CMM 100 may take one or more actions. At step 903, the CMM 100 may take remedial action, such as stopping motion of the probe 212 or probe head 200, or causing the probe 212, probe head 200, or arm 104 to repeat, in reverse order, one or more movements that preceded the crash. Indeed, illustrative embodiments may take other remedial action and thus, the noted remedial actions are illustrative specific embodiments only.

Figure 9B:
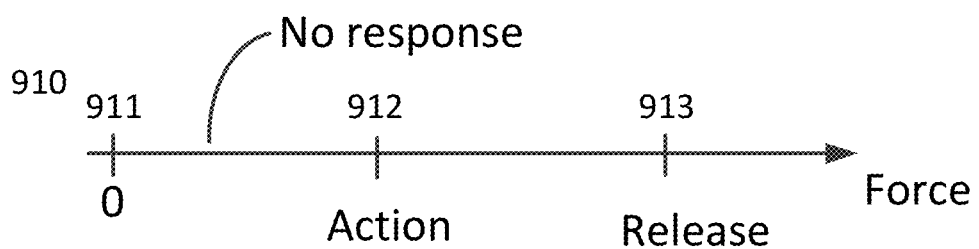
FIG. 9B schematically illustrates various levels of force imposed in a crash.

The remedial action may be conditional on the severity of the crash. For example, in some embodiments, the CMM 100 may take remedial action only if the crash causes an impact force, as applied to a probe 212 or probe head 200, that exceeds a given threshold. Various exemplary thresholds are schematically illustrated in FIG. 9B. It may not be prudent in some embodiments to take remedial action for a slight bump or contact with an object that causes a slight impact force (e.g., below threshold 912 in FIG. 9B) on a probe 212 or probe head 200. For example, if a probe is a tactile probe that requires contact with a workpiece 150 in order to measure the workpiece 150, such a level of contact would not be sufficient to cause the sensor 241 to react, and would be less than the force threshold 912. Accordingly, the given threshold may be established at a somewhat higher force 912. In this way, for example, the CMM 100 may continue executing a measurement operation despite of the slight bump, thereby avoiding the need to re-start or repeat a measurement of a workpiece 150.

Alternately, or in addition, the remedial action may release the probe 212 from its probe clip 222, for example if the impact force exceeds a release threshold 913. A release threshold may be less than, equal to, or greater than an action threshold 912, but in any case is less than that which would damage the probe 212 if the probe 212 could not move.

Figure 10A:
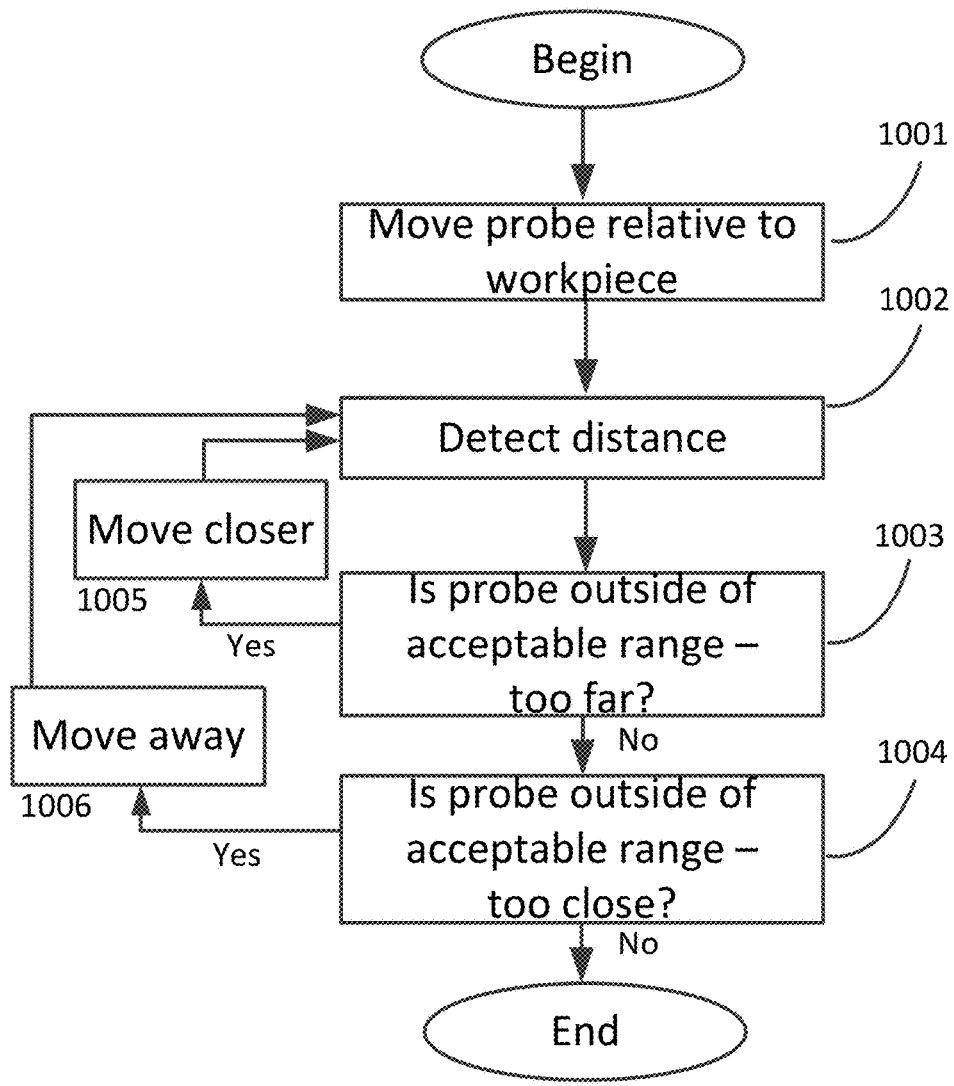
FIG. 10A is a flow chart that illustrates a method of adjusting the range of an optical probe.
Figure 10B:
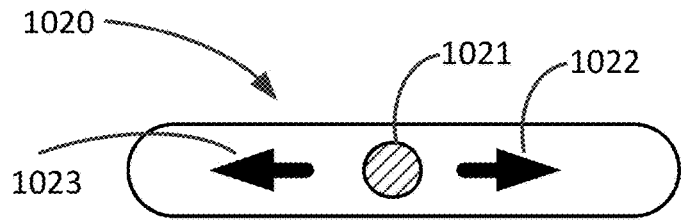
FIG. 10B schematically illustrates a user interface for adjusting the range of an optical probe.

FIG. 10A schematically illustrates a method of adjusting the distance between an optical probe 212 and a workpiece 150, for example as part of a process of measuring the workpiece 150. To help describe this method, FIG. 10B schematically illustrates a corresponding user interface 1020. At step 1001, using the CMM controller 120, an operator moves the probe is moved to a position relative to the workpiece 150. At step 1002, the CMM 100 detects the distance between the probe 212 and the workpiece 150, and assesses whether the probe 212 is within an acceptable range of distances from the workpiece 150. For example, an acceptable range of distances from the workpiece 150 may be specified by a measuring protocol uses to measure a specific workpiece 150.

More specifically, at step 1003, the CMM 100 or an operator assesses whether the probe 212 (or probe head 200) is too far away from the workpiece 150. If so, the CMM 100 moves the probe 212 (or probe head 200) closer to the workpiece at step 1005. Such motion may be performed automatically by the CMM 100 under control of the controller 120, thus automating a process otherwise performed by a human operator, or in response to control by an operator. Optionally, the process may then return to step 1002 to detect, and then assess the distance, again, and repeat steps 1003 and 1005 until the probe 212 (or probe head 200) is no longer too far from the workpiece 150.

Alternately, or in addition, the CMM 100 or an operator assesses whether the probe 212 (or probe head 200) is too close to the workpiece 150 at step 1004. If so, the CMM moves the probe 212 (or probe head 200) away from the workpiece at step 1006. Such motion may be performed automatically by the CMM 100 under control of the controller 120, or in response to control by an operator. Optionally, the process may then return to step 1002 to detect, and then assess the distance, again, and repeat steps 1004 and 1006 until the probe 212 (or probe head 200) is no longer too close to the workpiece 150.

In some embodiments, step 1004 may be performed prior to step 1003.

FIG. 10B schematically illustrates a user interface 1020 configured to allow the CMM 100 to communicate with an operator during the foregoing processes. Such a user interface 1020 may be disposed on an arm or other portion of a CMM 100, or may be displayed on a computer screen in communication with the CMM 100, to name but a few examples. In operation, if the probe 212 is too far from the workpiece 150, the CMM 100 illuminates arrow 1023 to instruct the operator to move the probe closer to the workpiece 150, and if the probe 212 is too close to the workpiece 150, the CMM 100 illuminates arrow 1024 to instruct the operator to move the probe away from the workpiece 150. If and when the probe is within an acceptable range of distances from the workpiece 150, the CMM 100 illuminates light 1021 to inform the operator accordingly.

Although the probe head 200 and its various features, and the probe clips and their features, as well as the foregoing methods, are described in terms of use with optical probes, they may also be used with non-optical probes, such as tactile probes, etc. For example, a probe head 200 supporting a tactile probe (e.g., 211), as known in the art, could be used to detect a crash between a feature of the probe head (e.g., probe platform 230; housing 260) and an object, and to take remedial action accordingly.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A probe head for a coordinate measuring machine, the probe head comprising:
   a mount;
   a probe platform configured to support at least one probe, the probe platform movably suspended from the mount;
   a housing movably suspended from the mount and at least partially surrounding the probe platform, or a probe suspended from the probe platform; and
   a sensor operably coupled between the mount and the probe platform such that displacement of the probe platform relative to the mount is transmitted to the sensor,
   the mount, the sensor, and the probe platform configured so that contact between: A) the probe platform or a probe coupled to the probe platform, and B) an object causes a change in an electrical property of the sensor.

2. The probe head of claim 1, wherein the sensor comprises a kinematic seat having electrically connectable conductive portions, the change in the electrical property including a break in a prior electrical connection between two of the electrically connectable conductive portions of the kinematic seat.

3. The probe head of claim 1, further comprising a stem between the probe platform and the sensor, the stem coupling the probe platform to the sensor and spacing the probe platform from the sensor.

4. The probe head of claim 1, wherein the housing at least partially surrounds the probe platform.

5. The probe head of claim 4, wherein the housing is coupled to the probe platform via a rod, the rod configured to transmit mechanical force or motion from the housing to the sensor via the probe platform.

6. The probe head of claim 5 wherein the rod is thermally isolated from the housing via a hysteretic coupling, the hysteretic coupling configured to mitigate transmission, from the housing to the sensor, of mechanical motion in the housing resulting from thermal stress.

7. The probe head of claim 6 wherein the hysteretic coupling comprises an aperture in the housing, and a fastener passing through the aperture and securing the housing to the rod, wherein a diameter of the aperture is greater than a diameter of the fastener such that the fastener may pass through the aperture without touching an inner surface of the aperture.

8. The probe head of claim 4, wherein the housing comprises a mechanical interface to allow an optical cable to pass through the housing to reach an optical probe suspended from the boom.

9. The probe head of claim 4, wherein the housing has a weight and is movably suspended from the mount by a spring, wherein the spring is configured to hold the housing in a nominal position, relative to the mount, in the absence of displacement of the housing by contact between the housing and the object.

10. The probe head of claim 9, wherein the spring is configured to return the housing to the nominal position, relative to the mount, after removal of contact between the housing and the object.

11. The probe head of claim 4, wherein the housing comprises a rigid plate and a rigid apron, the plate coupled to the mount, and the apron movably coupled to the plate.

12. The probe head of claim 4, wherein the housing comprises a rigid plate and a rigid apron, the plate coupled to the mount, and the apron removably coupled to the plate.

13. A coordinate measuring machine for measuring a workpiece, the coordinate measuring machine comprising a base configured to support the workpiece during measurement, and an arm movable relative to the base, the arm configured to support at least one probe for measuring the workpiece under control of a controller, the coordinate measuring machine comprising:
   a probe platform coupled to the arm and configured to support the at least one probe; and
   a sensor operably coupled between the arm and the probe platform such that displacement of the probe platform relative to the arm is transmitted to the sensor,
   the arm, the sensor and the probe platform configured so that contact between A: the probe platform or a probe coupled to the probe platform, and B) an object causes a change in an electrical property of the sensor,
   the controller configured to move the arm in response to the change in the electrical property of the sensor to mitigate damage to the probe platform or the sensor.

14. The coordinate measuring machine of claim 13 further comprising a housing movably suspended from the arm and at least partially surrounding the probe platform, or a probe suspended from the probe platform.

15. The coordinate measuring machine of claim 14, wherein the housing is coupled to the probe platform via a rod, the rod configured to transmit mechanical force or motion from the housing to the sensor via the probe platform.

16. The coordinate measuring machine of claim 15 wherein the housing rod is coupled to the rod via a hysteretic coupling, the hysteretic coupling configured to mitigate transmission, from the housing to the sensor, of mechanical motion in the housing resulting from thermal stress.

17. The coordinate measuring machine of claim 14, wherein the housing is movably suspended from the arm by a spring, the spring configured to hold the housing in a nominal position, relative to the arm, in the absence of contact between the housing and the object.

18. The coordinate measuring machine of claim 14, wherein the housing is movably suspended from the arm in a nominal position, wherein a spring operably coupled to the mount is configured to return the housing to the nominal position after removal of contact between the housing and the object.

19. A probe head for a coordinate measuring machine, the probe head comprising:
   a mount;

a probe support means for supporting at least one probe, the probe support means suspended from the mount;

a housing means for at least partially surrounding the probe platform, or a probe suspended from the probe platform, the housing means movably suspended from the mount; and sensor means, operably coupled between the mount and the probe support means, for sensing displacement of the probe support means relative to the mount, the mount, the sensor means, and the probe support means configured so that contact between: A) the probe support means or a probe coupled to the probe support means, and B) an object causes a change in an electrical property of the sensor means.

20. The probe head of claim 19, wherein the housing means at least partially surrounds the probe support means.

* * * * *